US012776079B2

(12) United States Patent
Schwaiger

(10) Patent No.: US 12,776,079 B2
(45) Date of Patent: Oct. 27, 2026

(54) RELATIONAL TERRAIN BRIDGE TO METAVERSE

(71) Applicant: Jim Schwaiger, Huron, SD (US)

(72) Inventor: Jim Schwaiger, Huron, SD (US)

( * ) Notice: Subject to any disclaimer, the term of this patent is extended or adjusted under 35 U.S.C. 154(b) by 0 days.

(21) Appl. No.: 19/410,395

(22) Filed: Dec. 5, 2025

(65) Prior Publication Data

US 2026/0094324 A1 Apr. 2, 2026

Related U.S. Application Data

(63) Continuation-in-part of application No. 18/212,594, filed on Jun. 21, 2023, now Pat. No. 12,511,802, which is a continuation-in-part of application No. 17/346,145, filed on Jun. 11, 2021, now Pat. No. 11,727,611, which is a continuation of application No. 16/914,252, filed on Jun. 26, 2020, now Pat. No. 11,055,885.

(51) Int. Cl.

*G06T 11/26* (2026.01)
*A63F 13/533* (2014.01)
*A63F 13/5378* (2014.01)

(52) U.S. Cl.

CPC ............ *G06T 11/26* (2026.01); *A63F 13/533* (2014.09); *A63F 13/5378* (2014.09); *A63F 2300/307* (2013.01); *A63F 2300/308* (2013.01); *G06T 2200/24* (2013.01)

(58) Field of Classification Search

CPC ..... G06T 11/26; G06T 2200/24; G06T 17/05; G06T 11/60; G06T 15/00; G06T 11/206; G06T 17/00; G06T 11/20; G06T 7/60; A63F 13/533; A63F 13/5378; A63F 2300/307; A63F 2300/308; A63F 13/60; A63F 13/52; A63F 13/63; H04W 16/18; G06F 16/29; G06F 30/20

See application file for complete search history.

(56) References Cited

U.S. PATENT DOCUMENTS

2017/0340971 A1* 11/2017 Schwaiger .............. A63F 13/20
2018/0053343 A1* 2/2018 Ren .......................... G06T 17/05
2019/0262715 A1* 8/2019 Ohashi .................. A63F 13/795

OTHER PUBLICATIONS

Engeström ("Organizing Innovation—Innovating Organization", 2002, https://d1wqtxts1xzle7.cloudfront.net/9367/u1rcsfgw90swx25qnfk.pdf?1737678216=&response-content-disposition=inline%3B+filename%3DOrganizing_Innovation_Innovating_Organiz.pdf&Expires=1770849639&Signature=FzBuLAAvm81x0uABVs~BqcAleyE4215MiHEgkADWQ4).*

* cited by examiner

*Primary Examiner* — Xilin Guo
(74) *Attorney, Agent, or Firm* — Ariel S. Bentolila; Bay Area IP Group

(57) ABSTRACT

A system, method and program product for providing a relational terrain, the method comprising the following steps: building a Villa, wherein said Villa is configured to be operable for containing one or more Tile(s); wherein each of said one or more Tile(s) comprise(s) one or more other Tile(s); establishing one or more relational link(s) between said Villa and one or more other Villa(s); wherein said one or more relational link(s) is/are a non-spatial link(s) connecting said Villa to said one or more other Villa(s) thereby establishing one or more relational terrain(s) that are not dimensional or spatial mapping; reflecting said one or more relational link(s) between said Villa and said one or more other Villa(s); and displaying said Villa and said one or more other Villa(s) in a relational map.

30 Claims, 20 Drawing Sheets

FIG. 9
900
905
910
915
DAILYWIRE
'Too-da-loo, Fredo': Chris Cuomo And CNN Slammed After Network Fires Host Following Scandal
Exploring
Relational
Space

FIG. 12
Emma
Ryan
Elizabeth
Chloe
Owen
David
Abigail
Lily
Abigail
Grace
Emma
Ethan
Benjamin
Samuel
Olivia
James
Sophia
Cat Videos
Lucas
Noah
Isabella
Abigail
Inner Sanctum
Owen
Sniveling about that math test
Like
Reply
David
It was brutal
Like
Haha
Lily
I'm gonna cry
Like
Haha
Owen
Abigail
Chloe
David
Lily
Abigail

1200

1500

FIG. 17
1700
705
Emma
Ethan
Benjamin
Samuel
Olivia
James
Sophia
Cat Videos
Cat Blog
Cat MD
Lucas
Noah
Isabella
Abigail

RELATIONAL TERRAIN BRIDGE TO METAVERSE

CROSS-REFERENCE TO RELATED APPLICATIONS

The present Utility patent application claims priority benefit of the U.S. nonprovisional application for patent Ser. No. 18/212,594, entitled "Functional Junctional Mosaic Terrains" and filed on Jun. 21, 2023, U.S. nonprovisional application for patent Ser. No. 17/346,145 entitled "System and Method for Providing a Relational Terrain for Social Worlds" and filed on Jun. 11, 2021, and U.S. nonprovisional application for patent Ser. No. 16/914,252 entitled "System and Method for Providing a Relational Terrain for Social Worlds" and filed on Jun. 26, 2020 under 35 U.S.C. 119(e). The contents of this/these related patent application(s) is/are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to Relational Space/Maps. More particularly, certain embodiments of the invention relate to Relational Terrain for designing Villas (homes) and harmonious communities, without limits on size or complexity. A user may locate a villa with Relational Links next to all other villas of interest at the same time, maximizing interaction and Villa value.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Any system without control creates chaos. The question is not whether to have a sovereign, but who is sovereign, and what may be the terms of sovereignty. For many generations, kings were sovereign, and controlled empires with abject force and authority, requiring no meaningful consent from their subjects (who were not really citizens in the classical sense). Disputes about overlapping claims of sovereignty were usually settled by force (typically by having subjects fight and destroy each other on behalf of the kings).

In time, along the borders of the Roman empire, small tribes and regions formed and were governed more by mutual collaboration and consent, fomenting the idea that individuals had some rights and sovereignty as well. The United States formed on the idea that sovereignty was a God given right, granted to the individual, rather than a king. Where needed, higher levels of authority might also exist (city, state, federal governments) but each of these were designed to take only such power as actually needed from below to manage civilized society. The federal government claims the rights it must have in the constitution, leaving all unclaimed rights to the individual states, and the states claim the rights they must and leave remainder to the individual, who remains sovereign. In Jefferson's words, "endowed by their Creator with certain inalienable rights . . . life, liberty and pursuit of happiness . . . governments . . . deriving their just powers from the consent of the governed . . . ."

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that individual sovereignty is rather new in human history and remains disputed. Some governments distrust individuals deciding for their own welfare and seek to help, some governments may be very helpful, especially those devoted to collective welfare. It is said that "to make an omelet, you must crack a few eggs", but in the words of the devout but disgruntled socialist, George Orwell, "Where is the omelet?" The lessons of the last century should be compelling but may be lost in the mist of time.

An expedient means of allowing existing apps in Relational Space is to add functional junctions to the front end of the app, essentially encapsulating the app and making it appear like a typical Relational Tile to villas in RS. This makes the app (and its many associated web pages) accessible to RS as a Tile, providing its full capabilities to users in RS, while keeping it fully operational to existing user base outside of RS. This provides a quick and easy way for existing apps and large user bases to interact seamlessly with RS. These traditional apps may be every bit as complex as other apps, because they may be traditional apps, in an RS compatible wrapper. It may eventually be desirable to move the apps to an intrinsic RS architecture, but this may likely take place with new development, not as a grinding tedious rewrite of legacy apps.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
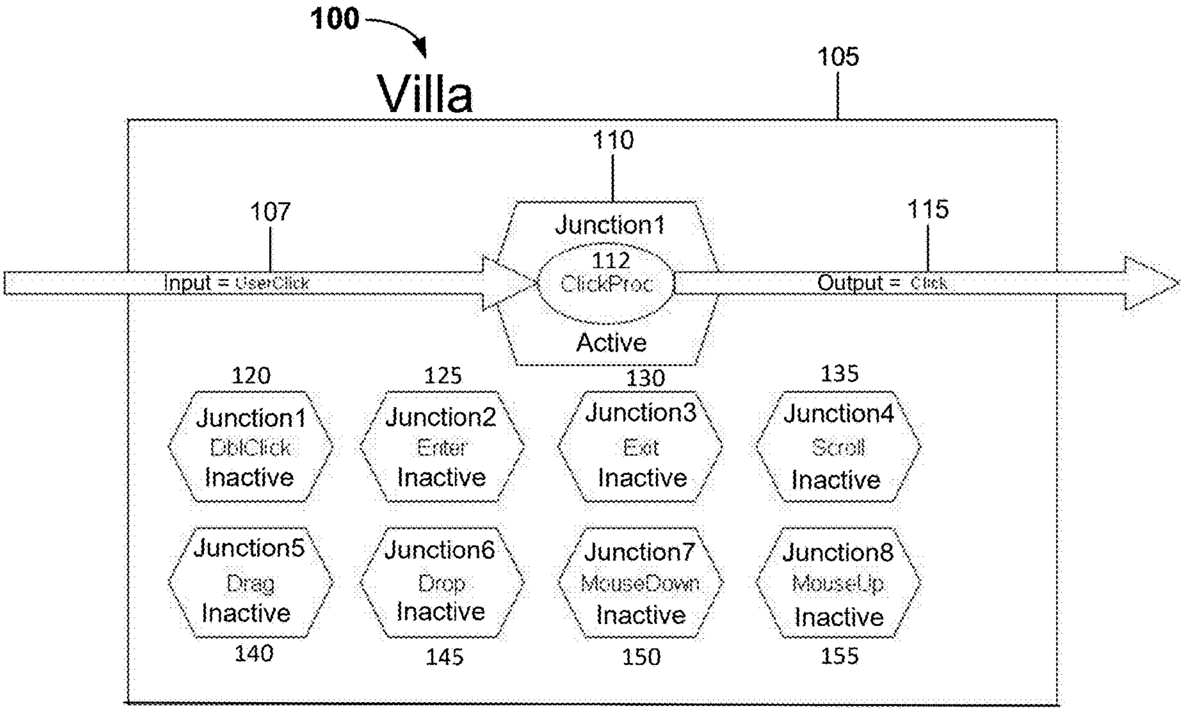
FIG. 1 is an illustration of an exemplary Villa with a Button Tile having Functional Junction and Inert Junctions, in accordance with an embodiment of the present invention.

Unless otherwise indicated, illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term [" substantially "] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearward most point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W] e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them-Such terms are open-ended and mean "including but not limited to". When employed in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C . . . sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s). Furthermore, any statement(s), identification(s), or reference(s) to a structure(s) and/or element(s) that corresponds to and/or supports a claim limitation(s) phrased in functional limitation terms covered by 35 USC § 112(6) (post AIA 112(f)) should be understood to be identified by way of example and not limitation, and as such, should not be interpreted to mean that such recited structure and/or element is/are the only structure(s) and/or element(s) disclosed in this patent application that corresponds to and/or supports such claim limitations phrased in functional limitation terms. This claims interpretation intention also applies to any such subsequent statements made by Applicant during prosecution.

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation of any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" that executes system/method embodiments of the present invention may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a smart phone; a PAD; phablets; smart watches; wearable computers; gaming devices/computers and/or entertainment systems; televisions; a netbook, a set-top box (STB); a mobile device; a wearable device (for example, a smart watch); an Internet of Things (IoT) device; application-specific hardware to emulate a computer and/or software, such as, for example, a digital signal processor (DSP), a field-programmable gate array (FPGA), fixed logic, finite state machines, and/or other circuits, an application specific integrated circuit (ASIC), an application specific instruction-set processor (ASIP); a chip; chips; a system on a chip; or a chip set; a data acquisition device; an optical computer; a quantum computer; a biological computer; and generally, an apparatus that may accept data, process data according to one or more stored software programs, generate results, and typically include input, output, storage, arithmetic, logic, and control units; and the like. That is, the computer processor may be implemented by employing various control logic of the computer device, which may be a general purpose processor, a Digital Signal Processor (DSP), an Application Specific Integrated Circuit (ASIC), graphics processing unit (GPU), a Field Programmable Gate Array (FPGA), a single-chip microcomputer, ARM (Acorn RISC Machine) or other programmable logic device, discrete gate or transistor logic, discrete hardware components, or any combination of these components. Also, the computer processor may be any conventional processor, microprocessor, or state machine. The computer processor may also be implemented as a combination of computing devices, e.g., a combination of a DSP and a microprocessor, a plurality of microprocessors, one or more microprocessors in conjunction with a DSP core, or any other such configuration.

The Hardware portion of the processing circuitry of the computer can include electric or electronic components configured to perform operations of the processing circuitry. The electric or electronic components can include one or more resistors, transistors, capacitors, diodes, inductors, logic gates (e.g., AND, OR, XOR, negate, buffer, or the like), amplifiers, memory devices, power supplies, analog to digital converters, digital to analog converters, oscillators, switches, multiplexers, buses, input/output ports, or the like.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. The embodiments herein closed are merely illustrative, wherein elements illustrated as separate elements may or may not be physically separate, and elements shown as elements may or may not be physical elements, may be located in one place, or may be distributed over a plurality of network elements. Some or all of any disclosed modules may be selected according to actual needs to achieve the purpose of the solution of the particular embodiment of the invention.

Furthermore, while the invention is described in the context of functional modules, it should be appreciated that, unless otherwise indicated, one or more of the described functions and/or features may be integrated in a single physical device and/or software module or one or more functions and/or features may be implemented in separate physical devices or software modules. It will also be appreciated that a detailed discussion of the actual implementation of each module is not necessary to an understanding of the present invention. Rather, the actual implementation of the various functional modules in the apparatus disclosed herein will be apparent to those skilled in the art from consideration of their attributes, functions and internal relationships. Accordingly, one of ordinary skill in the art can implement the invention as set forth in the claims without undue experimentation. It is also to be understood that the specific concepts disclosed are merely illustrative and are not intended to be limiting upon the scope of the invention, which is to be defined in the appended claims and their full scope of equivalents.

Logic and/or steps represented in the flowcharts or otherwise described herein, e.g., a ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. For the purposes of this description, a "computer-readable medium" can be any means that can contain, store, communicate, propagate, or transport the program for use by or in connection with the instruction execution system, apparatus, or device.

"Software" may refer to prescribed rules to operate a computer. Examples of software may include: code segments in one or more computer-readable languages; graphical and or/textual instructions; applets; pre-compiled code; interpreted code; compiled code; and computer programs. Embodiments of the present invention may be implemented by means of software plus a general purpose hardware platform, or may be implemented by hardware executing state machine logic. Based on such understanding, any references to "Software" herein also refers to technical solutions that may be embodied essentially or in a part contributing to the related art in the form of a software or firmware product, which may exist in a computer-readable storage medium such as EEPROM/ROM/RAM, a magnetic disk, an optical disk, etc., including several instructions or logical gate functional sequences for causing a computer device (which may be a personal computer, a server, or a network device, etc.) to execute the method of the respective embodiments or some parts of the embodiments.

That is, the functions, if implemented in the form of software functional units and sold or used as a stand-alone product, may be stored in a computer-readable storage medium. Based on this understanding, the technical solution of the present invention may be embodied essentially or in a part contributing to the prior art or in a part of the technical solution in the form of a software product stored in a storage medium, comprising several instructions for causing an electronic device (which may be a personal computer, a server, a network device, etc.) to perform all or part of the steps of the method according to the embodiments of the present invention. And the aforementioned storage medium includes: a U-disk, a removable hard disk, a Read-Only Memory (ROM), a random access Memory (RAM, random Access Memory), a magnetic disk, or an optical disk, or other various media capable of storing program codes.

Hence, generally, functions described herein (for example, the features illustrated in the figures of this application) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While embodiments herein may be discussed in terms of a processor having a certain number of bit instructions/data, those skilled in the art will know others that may be suitable such as 16 bits, 32 bits, 64 bits, 128s or 256 bit processors or processing, which can usually alternatively be used. Where a specified logical sense is used, the opposite logical sense is also intended to be encompassed.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention may be described below with reference to flowchart illustrations and/or block diagrams of methods, apparatus (systems) and computer program products according to embodiments of the invention. In some alternative embodiments, the functions/acts noted in the block diagrams may occur out of the order noted in the operational illustrations. For example, two blocks shown in succession may in fact be executed substantially concurrently or the blocks may sometimes be executed in the reverse order, depending upon the functionality/acts involved. Furthermore, the embodiments presented and described in the flowcharts of the present invention are provided by way of example in order to provide a more thorough understanding of the technology. The disclosed methods are not limited to the operations and logic flows presented herein. Alternative embodiments are contemplated in which the order of various operations is changed, and in which sub-operations described as part of a larger operation are performed independently.

It will be understood that each block of flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. More generally, Volatile memory media may include Random Access Memory (RAM), which acts as external cache memory. By way of illustration and not limitation, RAM may be available in many forms such as Synchronous RAM (SRAM), dynamic RAM, (DRAM), synchronous DRAM (SDRAM), double data rate SDRAM (DDR SDRAM), enhanced SDRAM (ESDRAM), synchl ink DRAM (SLDRAM), and Direct Rambus RAM (DRRAM). The disclosed memory components or memories of the operating environments for implementing systems and methods that carry out the present invention may comprise one or more of these and/or any other suitable types of memory.

Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read. Any computing memory may be coupled via a communication bus or otherwise.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

In client/server environments, the server may be located in a cloud platform anywhere in the network, whereby the cloud platform includes, but is not limited to, a single network server, a server group formed by a plurality of network servers, or a cloud formed by a large number of computers or network servers in cloud computing, wherein the cloud computing is one of distributed computing, and is a super virtual computer formed by a group of loosely coupled computer sets. The computer device can be used for realizing the application by running alone, and can also be accessed into a network and realized by interaction with other computer devices in the network. Wherein the network in which the computer device is located includes, but is not limited to, the internet, a wide area network, a metropolitan area network, a local area network, a VPN network, and the like. The client or terminal equipment and the cloud platform are mutually communicated to form the system(s) provided by embodiments of the disclosed applications.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," "matching" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As a general matter, the methods and systems described herein comprising any such "processing," "computing," "calculating," "determining," ""matching," or the like, actions and/or processes may include, or otherwise make use of in conjunction with other algorithmic/programming techniques, one or more machine-trained models to carry out one or more function(s) or claimed purpose(s)/intent(s)/object(s) of any aspect of the invention. Machine learning (ML) generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various words and contents (e.g., icons, images, or emoticons) and/or identify suggested contents that relate to a text entered by a given user. Such determination may be made following the accumulation, review, and/or analysis of user data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of contents and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. It is to be understood that portions of the present invention may be implemented in hardware, software, firmware, or a combination thereof. In the above-described embodiments, the various steps or methods may be implemented in software or firmware stored in a memory and executed by a suitable instruction execution system. For example, if implemented in hardware, as in another embodiment, may be implemented using any one or combination of the following techniques, as is well known in the art: discrete logic circuits having logic gates for implementing logic functions on data signals, application specific integrated circuits having suitable combinational logic gates, programmable Gate Arrays (PGAs), field Programmable Gate Arrays (FPGAs), and the like.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium may include, but is not limited to, a hard drive, compact disc, flash memory, volatile memory, random access memory, magnetic memory, optical memory, semiconductor based memory, phase change memory, periodically refreshed memory, quantum memory, and the like; the non-transitory computer readable medium, however, does not include a pure transitory signal per se; i.e., where the medium itself is transitory.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

In some embodiments of the present invention and variations thereof, relate to Relational Space/Maps. In one embodiment of the present invention, Relational Terrain users may design Villas (homes) and harmonious communities, without limits on size or complexity. A Villa with Relational Links may be located next to all other villas of interest at the same time, maximizing interaction and villa value. A villa may be built from one or more Tiles using Functional Junctional Mosaic Terrain (FJMT). FJMT may allow a combination of several prebuilt Tiles for complex functions, adding the pieces created, to produce a finished Tile or application, dramatically lowering a threshold for creating something useful. This may allow a less capable user to create a complex Tile (or Tile App) by combining several Tiles already available in Relational Space with a single Tile that he is able to create or modify to reflect his creativity. Thus, his creation includes several Tiles that he is unable to create on his own, but incorporates his meaningful contribution to create a whole which is more than the sum of its parts, and does not suffer from his lack of skill in certain areas. His innovation rests upon the shoulders and wisdom of those who went before him.

In other embodiment, Relational Space (RS) users may own homes (e.g. Villas) and harmonious communities, governed by mutual consent. Villas may be located near all other Villas of interest by placing Relational Links, giving each Villa multiple simultaneous locations, maximizing social and economic interaction/visibility/value.

In some embodiment, Villas may be built from mosaic Tiles, connected by functional junctions, creating dynamic functional terrain. Tiles may contain other Tiles, and may have even great internal complexity, but may be simple on the outside, similar to home appliances (e.g. washing machine, cell phone, car), usable by everyone. Typed inputs/outputs of Tile junctions may allow designers to guide users in their connection and facilitate assistance from artificial intelligence. Relational Space (RS) may allow freedom, ownership and creative expression for every user, even those with just a cell phone. Billions of users need a useful social world in which they may interact—not requiring specialized hardware—that is adaptable/compatible to future metaverse generations.

Since user Villas may be complex, and the Tiles from which they may be built may also be complex, consider the properties of complex entities, and how they might be constructed as follows;

Complex entities such as, without limitation, Tiles:

May be used by ordinary people (even children), without programming, if they may be simple on the outside (e.g. washing machine, cell phone, car) with typed connectors—may be complex on the inside, but simple on the outside, making them usable by ordinary people who may be unable to understand their internal complexity. May be created by connecting many building blocks, simple on the outside, complex on the inside (e.g. cells form complex animals)—may be created by combining or connecting many simpler building blocks (Tiles). For example, Neurons→Brains, LEGOS→complex builds (by children, with guidance.), Cells→humans and other complex animals, Transistors and simple circuits→Microprocessors, People→Communities and Countries, Appliances (washing machines, toasters, refrigerators, televisions, computers)→homes, People/Homes→Communities, etc.

May be apparently different from each other, but share the same software/DNA (e.g. human and chimp have approximately 99% gene overlap, even humans and dogs have approximately 75% overlap)—may seem very different from each other, yet share most of the same software/DNA.

Achieve different expression through software/gene regulation of the same DNA (e.g. brain and liver cells have the same DNA)—may achieve different forms and functions through software/gene regulation.

Add to proven designs, rather than de novo construction (mouse/pig/human use the same insulin gene). We reach great heights by standing on the shoulders of those who went before us—often achieve complexity by improving on proven designs, rather than de novo construction.

Achieve genetic/software diversity through recombination (of proven genes) rather than creating new genes (sexual reproduction shuffles the deck before dealing chromosomes to the child)—may achieve genetic/software diversity through recombination rather than creating new genes. For example, sexual reproduction shuffles the deck before dealing chromosomes to the child. This may partially repeat earlier in this paragraph.

Design Implications for Relational Terrain-Nature solves a problem once, then reuses that solution. When creating a new species, nature does not create a new insulin gene—she uses the same gene used by the mouse, horse, pig and human. New genes usually modify a proven gene. A new social/relational operating system, with recursive modular Tiles, favors nature's reuse model. Tiles and functional junctions rely on the shared wisdom guiding all of Relational Terrain.

Foundation of a few dozen versatile/configurable Tiles—As nature reuses foundational genes, public release may have a few dozen highly versatile and configurable Elemental (programmed) Tiles used everywhere in Relational Terrain (e.g. Button, String Edit/Display, Text Edit/Display, Image, Video Record/Display, Audio Record/Display, MediaStream™). Such a small number of Tiles may not provide 100% of Facebook™/Twitter™/TikTok™ functionality. A roughly 80% ("good enough") in a first release, combined with the unique features of Relational Terrain, may provide a valuable social alternative. Settling for a modest release target allows public release in about 18-24 months. Over time, roughly 80%→90%→95%+.

Simplifying Dozens of Tiles into a single MagicTile-instead of creating dozens of different programmed Tiles, a single "MagicTile" that aspires to do everything does everything may be created. MagicTile would need to be extremely capable, extremely configurable. This seems impossible, but nature shows the way. Much of the core functionality of a few dozen core Tiles could be consolidated into a single extremely capable, extremely configurable MagicTile, which could be the ancestor of all Tiles in the system, providing its functionality to all of its descendants. MagicTile would also create a single place to create and standardize function, interface and maintenance.

Consider, for example, the human body, the evolutionary pinnacle of function and development, having a brain with complex language and abstract reasoning, striving for unlimited potential. Humans are remarkable, maybe too complex for analogy, since they may be built not from a few dozen types of Tiles, but many highly specific cell types, with thousands of genes. Nature does not give up, and neither should we. Human potential was unthinkable in the days of single cell organisms. Progress builds upon progress. Nature built on what she learned from single cells to create fish, reptiles, mammals. This is seen in the DNA, finding genes (modules) that move from lower species up the evolutionary tree. Humans may still seem too complex for analogy to a few dozen Tiles, since humans have many highly specific cell types. This may be an illusion. Humans have a single cell type, the human cell, which is extremely capable, extremely configurable. Every human cell may contain the same software (DNA). Every human may start from a single cell, which divides into multiple identical cells before eventually dividing into different cells of increasing specialization to form for example, liver, bone, muscle and brain-many specific cell types, all with the same software. The differences between specialized cells may come from exquisite regulation (configuration) of the same software. Nature creates extremely capable, extremely configurable cells, an inspiration for the MagicTile. Mere human designers may not achieve infinite function, so aim for a more modest target, perhaps about 80% of extreme capability, which might go to roughly 85%→90%→95%+, over time. Keep in mind, even Facebook™ still strives for extreme functionality.

Inspired by the human cell and its software (DNA), a substantially capable, substantially configurable MagicTile may be created, striving for all of the capability needed in a few dozen programmable Tiles. If it is a success, creating a new Tile means configuring the MagicTile for its specialized purpose. Even if the pure dream of MagicTile is not realized (infinity is unreachable), reaching for infinity simplifies the task of providing function in its descendants, along with the standardization of functions and interfaces. Realizing the MagicTile avoids the Tower of Babel (e.g. competing incompatible languages and methods of expressing function). A common Tile based language with standardized function and expectations (MagicTile) may enable user creativity and acceptance.

Development of the MagicTile and its derivative Elemental (Programmed) Tiles is Iterative. MagicTile has most functions needed to support the few dozen Elemental Tiles, but as these Tiles may be developed, new needs may be discovered. Some functions may be first implemented directly in an Elemental Tile (for expediency), but later integrated back into the MagicTile (especially where multiple Tiles need a particular function). In this way, the MagicTile continually increases functionality, and each individual Elemental Tile may mostly use MagicTile functionality, keeping each Elemental Tile as simple as it may be. MagicTile development would be iterative and ongoing, always seeking to move as much function as practical into the MagicTile to make it available (by configuration) to all descendant Tiles.

Capabilities of the MagicTile—the MagicTile may strive for extreme capability, but a more finite list of realistic MagicTile capabilities, supporting the few dozen programmed Elemental Tiles may be achieved. For example, without limitation, Back/ForeGnd color, Back/ForeGnd Image, Back/ForeGnd Text, Hint, Palette, CanvasSize (supports scrolling canvas larger than Tile e.g. navigator window on map), CanvasFit, Audio Record/Play, Video Record/Play, Visible Pages (Tiles), Page (Palette) Style, Menu, MenuStyle, Range (integers). User Events-(enabled/disabled/undefined) Click, DblClick, Hover, Enter, Exit, SwipeXY, SwipeX, SwipeY, MouseDown/Up, Drag, Drop, Scroll.

Configuring the MagicTile (and its descendants)—the MagicTile may be configured for specific functions. Consider a simple example, the RoundButton, which is derived from Button, which is, like every Tile, descended from MagicTile. Create the Button from MagicTile by setting its BackGnd Image to the image of a standard button StdBtn. Img, and the onClick event is available. The RoundButton is derived from Button by changing the BackGnd Image to RoundBtn. Img. All Tiles may share the same DNA (entire genome) from MagicTile where more specialized Tiles may have additional functions appended.

A simple way to represent the difference between MagicTile, Button, and RoundButton using a punctuated string, or a qList, may take the form:

*ListName*|name1: value1|name2: value2| … |*nameN*: *valueN*|

In a very concise way, this may allow setting multiple parameters and also provides a mechanism by which parameters may be inherited and combined very quickly even on lower end or RISC CPUs. For MagicTile, the configuration list (CFG) is the (named) null list.

For Button, set the BackGnd Image and enable the onClick event.

*CFG*|Mom: *MagicTile*|*BackGndImg*: *StdBtd.Img*|*onClick*|

The presence of "onClick" indicates that this attribute is relevant (or enabled) for this Tile, but does not specify a value (e.g. explicitly disabling the feature by onClick=0 or FALSE).

For RoundButton, inherit from Mom, in this case Button, so the CFG string for the RoundButton prototype is:

*CFG*|Mom: Button|*BackGndImg*:*RndBtn.Img*|

So, when a RoundButton is loading, grab the prototype for RoundButton, and its CFG file (default settings) is:

Mom: Button

*BackGndImg*: *RndBtn.Img*

Scroll back in the Tile prototypes until hitting the root, which is MagicTile. Search "Mom", in this case "Button", or its CFG settings:

*CFG*|Mom: *MagicTile*|*BackGndImg*: *StdBtn.Img*|*onClick*| ===

Mom: *MagicTile*

*BackGndImg*: *StdBtn.Img*

*onClick* {enabled}

Because "Button" has a "Mom", keep going until hitting the Root (MagicTile), load CFG for "Button" Mom, which is MagicTile:

CFG| which has the null list named CFG, the end is reached.

Concatenate the settings for MagicTile (in this case, null) with the settings for Button prototype, and get:

*CFG*|Mom: *MagicTile*|*BackGndImg*: *StdBtn.Img*|*onClick*| ===

Mom: *MagicTile*

*BackGndImg*: *StdBtn.Img*

*onClick* {enabled}

And, now concatenate settings for RoundButton, which replaces the original BackGndImg with the RndBtn. Img, and replaces the "Mom" with "Button".

Mom: Button

*BackGndImg*: *StdBtn.Img* onClick {enabled}

After that work, the MagicTile, the Button and the Round-Button Tile prototypes may be loaded in a local cache of Tile prototypes. When to load an instance of RoundButton, simply copy the CFG string for that prototype

*CFG*|Mom: Button|*BackGndImg*: *RndBtn.Img*|

Giving the resulting individual settings

Mom: Button

*BackGndImg*: *RndBtn.Img* onClick {enabled}

To set the Text of the instance to "Save" and the Color to "Red", that is stored in the instance as:

Tile: *RndButton*

*ForGndTxt*: Save

*ForGndClr*: Red

Tile programmers may store the resulting string of parameters copied from the RndButton Tile prototype with the instance, for simplicity and efficiency of repeated access.

*CFG*|Mom: Button|*BackGndImg*: *RndBtn.Img*|

To store the entire concatenated list with each instance, suspect that would be increasingly costly as Tiles become more complex.

Each Tile prototype is derived from an ancestral form, which is probably also derived from another Tile Def, until reaching the root (MagicTile). Store with each TileDef the settings which have changed (been added or overridden their ancestral values). Note these multiple TileDef references running up the tree to the root need only happen when a TileDef is first loaded, after that, its data is persistent until forced out by disuse/garbage collection. Expect that ~80% of the Tiles will remain the same as a user runs from one Villa to another and will not need to be reloaded.

Configuring and Interfacing with a Tile—Without inputs and outputs, a Tile is a black box—simple and structural, but not functional. The functions of a Tile may be controlled by its inputs and outputs—or more specifically, the inputs/outputs of its functional junctions.

By default, a junction placed in a Tile has its inputs/outputs available on the Tile surface for connection to other Tiles. In some cases, a junction input or output may be connected to ground, so it does not appear on the Tile surface. If a Junction is inactivated, its inputs/outputs may be invisible and/or unavailable.

The present invention will now be described in detail with reference to embodiments thereof as illustrated in the accompanying drawings.

FIG. 1 is an illustration of an exemplary Villa 100 with a Button Tile 105, in accordance with an embodiment of the present invention. In one embodiment of the present invention, Tile 105 may include, without limitation, one or more functional junctions 110, related to its primary input (user click) 107 and output (click) 115 that may be connected to another Tile for a more complex combined function. Any Tile (e.g. 105) may inherit all of the junctions 110-155 and properties of the Tiles from which it is descended including, without limitation, MagicTile, but activates only those that may be appropriate to its specialized function. A MagicTile may allow its canvas to be of different size than the Tile itself. This may allow the Tile to be a window into the canvas, which could be larger and/or scrollable. A Villa may also have those features in how it displays its Tiles since it is a Tile. A Villa (e.g. 100) may comprise one or multiple Tiles (e.g. 105). Villas may have one or more functional junctions (e.g. 110-155) and may connect to other Villas through Relational Links. A specialized Relational Link called Portal, may allow a two-way communication of data, by value or reference. The connection may require the consent of both Villas, agreeing on the data to be passed. A Tile Editor may be used to edit Villas and Tiles. Tile(s) 105 within a Villa (or Persona) 100 may potentially connect to each other using functional junctions 110. Tile(s) 105 and/or Villa(s) 100 may be highly configurable including, without limitation, foreground and background text, images, colors, etc. A number of Junctions 120-155 may be inactivated (e.g. shown in the lower portion of Tile 105). The inactive Junctions 120-155, having no inputs 107 and/or outputs 115 extending to the surface of Tile 105, may be inert.

Functional Junction Tile Connections being "As Simple as Possible". A MagicTile and its descendants may have internal capability, but external simplicity may be defined. The external interface should be "as simple as possible, but not simpler."

In some embodiments, Tile 105 may have a functional connection with another Tile, when Functional Junction 110 is placed in Tile 105 including, without limitation, typed input 107, a specific process 112, and typed output 115. The typed inputs/outputs may connect to compatible typed inputs/outputs of other Tiles, and an incoming data is processed in a defined way by its specific process before being passed on. The Functional Junction (e.g. 105) may allow the Tile to communicate with the world at large, or more specifically, with another Tile (e.g. inside the same Villa, or in another Villa).

By defining the typed inputs and outputs, a Tile designer may give guidance to future Villa owners or designers about how to connect a Tile. For example, without limitation, a washing machine has a similar design. The washing machine may comprise typed water inputs (hot and cold), typed electrical input, typed water output, typed input/output for clothing, typed detergent and bleach inputs, and buttons to control cycle, water temperature and other details by a user. The typed inputs/outputs of the washing machine may be helpful, though not foolproof. The water input may not physically connect to the electrical input, and clothes may be too large to fit in the detergent input. A user who fails to connect the water output to the drain input for the house soon discovers the mistake. Tile designers may be too ambiguous in typing the inputs/outputs of the functional junctions, by which this creates a mistake potentially detectable by the user (or AI assistant).

In other embodiment, a Functional Junction may define Additional Tile Functions—the MagicTile is extremely capable and configurable, but infinity cannot be reached in the MagicTile alone, and there may be times when a Tile designer wants the functions of the Tile to reach extreme+1. For instance, the designer may add a Functional Junction to the Tile, with one or more typed input(s), a specific process to handle data before passing it on, and one or more typed output(s). Since any Tile may have one or multiple (e.g. even many) Functional Junctions, the Tile may have many additional functions beyond the MagicTile from which it is descended. Some designers may write much of their own capability directly, rather than relying on the capability of the MagicTile. Relational Terrain generally allows this, and expects that at least initially, some designers may prefer to implement their own hand-crafted code in the Tiles using conventional programming techniques rather than the modular approach conceived by Relational Terrain. Future advances inconceivable today may create immense new capabilities inside Relational Tiles, beyond the functions conceived by MagicTile. Relational Terrain substantially supports this, and Functional Junctions may allow placement of the new functional generations inside the Tile, connecting the Tiles in a sensible way to other Tiles in Relational Space.

Functional Junction may be Enabled/Disabled as Needed for Configured Functions. A MagicTile descendant with extreme functionality may have extreme internal complexity, but Tiles should always be as simple as possible, on the outside, where the inputs/outputs for the functional junctions may be found. Having the outside of a Tile bristling with unlimited inputs and outputs is NOT simple.

Each disabled functional junction may have its inputs/outputs disabled/hidden as well. Having an input/output for a disabled function hanging off a Tile is nonsensical and confusing for the user/designer. Nature may do the same, creating appropriate proteins or receptors only for functions active within a cell (even though the cell's software/DNA may make it extremely more capable).

In some embodiment, Functional Junction Inputs/Outputs may allow bidirectional data. For example, without limitation, Inputs may accept incoming data. Outputs may send outgoing data. Both Inputs and Outputs may be bidirectional, accepting incoming data and sending outgoing data, which is more versatile than their names imply. The input/output designation may provide guidance to users/AI about how the junction may be connected. A Junction may have one or multiple typed inputs and/or typed outputs.

In further embodiments, Junction Inputs/Outputs may be typed as Relational Links, replaying the theme that Tiles may be connected through junctions with typed inputs/outputs. Relational Links may be a type of functional junction, with the additional property of assigning locations in Relational Terrain. Portals between Villas may be connections allowing bidirectional passage of data. Portals may be another type of functional junction. Junctions may combine to form a complex functional network (of Junctions) within a Tile.

Figure 2:
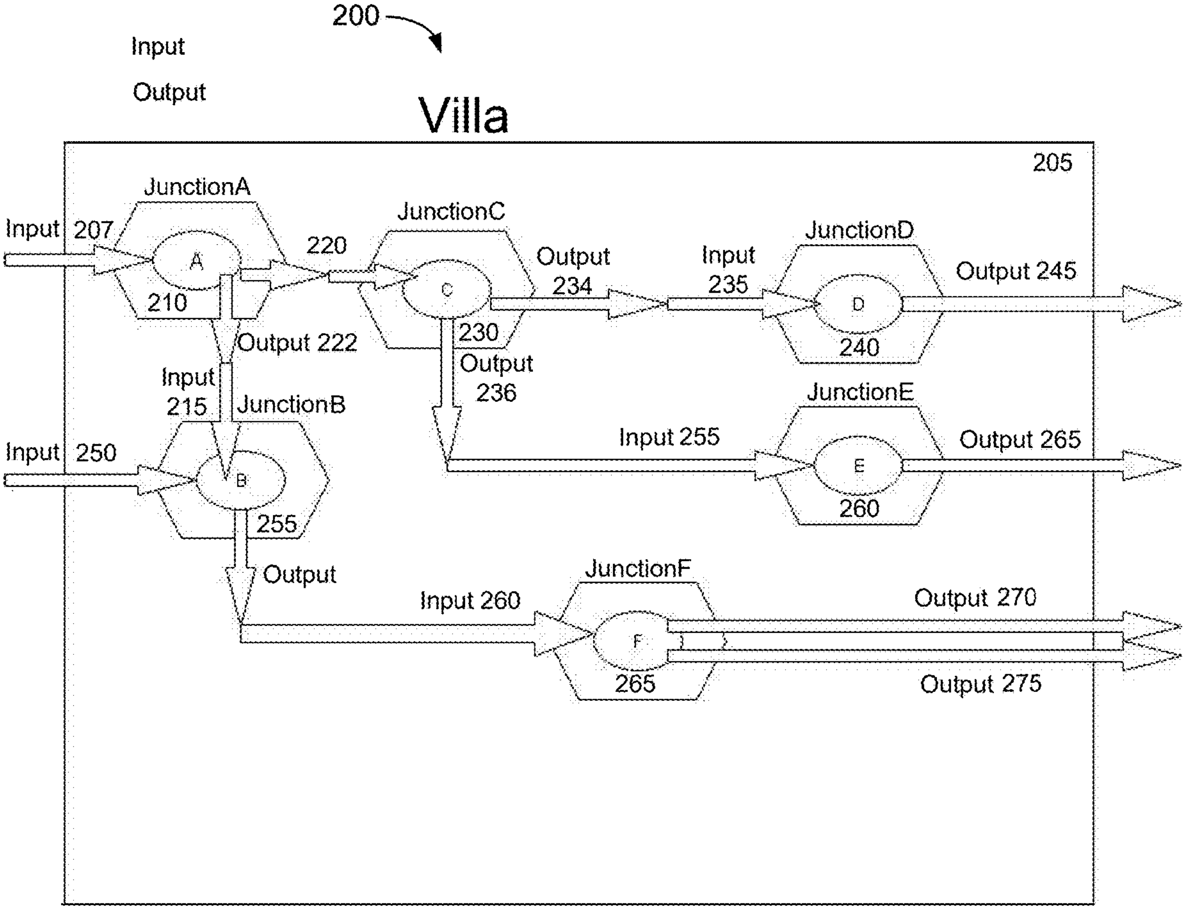
FIG. 2 is an illustration of an exemplary Villa having a Button Tile with interconnected multiple Functional Junctions, in accordance with an embodiment of the present invention.

FIG. 2 is an illustration of an exemplary Villa 200 having a Button Tile 205 with interconnected multiple Functional Junctions 207-265 (e.g. JunctionA-JnctionF), in accordance with an embodiment of the present invention. In one embodiment of the present invention, a complex internal network of functional junctions 210 230 240 260 255 265 is provided. By default, inputs 207 250 of functional junction 210 255 may project to the surface of Tile 205, seen in junctions A 210 and B 255. By default, the outputs 245 265 270 275 of the functional junction may project to the surface of Tile 205, seen in junctions D 240, E 260, and F 265. Inputs 207 250 and outputs 245 265 270 275 may also be connected to functional junctions inside Tile 205, as shown, allowing junctions 210 230 240 260 255 265 to be combined inside single Tile 205 for complex operations. For example, without limitation, functional Junction A 210 has two outputs 220 and 215, one connected to Junction C 230, another to Junction B 255. Junction B 255 has a single output 260, connected to Junction F 265. Junction C 230 has two outputs 235 255, connected to Junctions D 240 and E 260.

Tile 205 and functional junctions 210 230 240 260 255 265 may seem complex, and that the average user would not be expected to create a Tile with such a complex internal network of junctions. Complexity may be required and sophisticated Tile designers should be able to do very complex Villas, internally, similar to the internal complexity of, for example, without limitation, a washing machine, cell phone and/or automobile, which may also be inscrutable to most users of these appliances.

Figure 3:
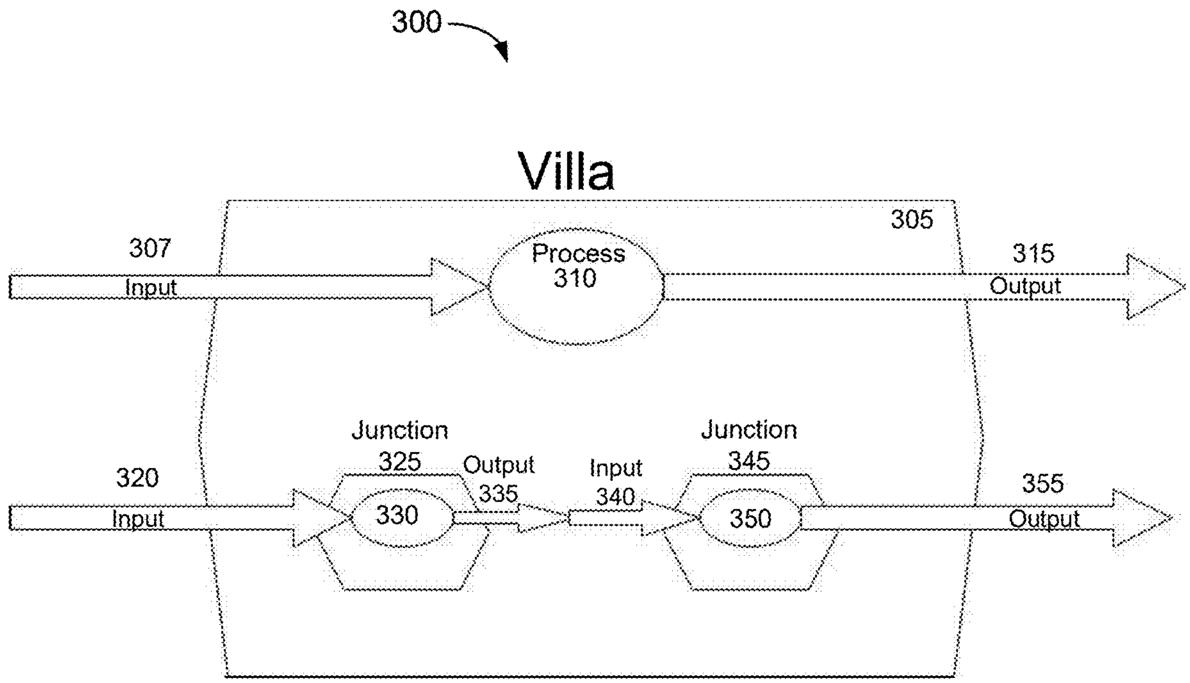
FIG. 3 is an illustration of an exemplary Villa with a Button Tile having linked multiple Functional Junctions, in accordance with an embodiment of the present invention.

FIG. 3 is an illustration of an exemplary Villa with a Button Tile, in accordance with an embodiment of the present invention. In an embodiment of the present invention, Tile 305 has its own input 307→process 310→output 315 at the top. Tile 305 may also contain two junctions 325 345, each with an input 320 340 and output 335 355. The left junction output 335 connects to input 340 of right junction 345. Input 320 of left junction 325 and output 355 of right junction 345 may reach the surface of the Tile containing them, which is default behavior. When a junction is placed into a container (Tile), the junction's inputs/outputs may project (by default) to the outside of its container.

In some embodiment, a villa owner may control which villas (users) may associate with which Tiles in his villa (and also designs the Relational Map of his Villa). Using his right to accept or reject other villas, the owner may curate his community and its code of conduct, including censorship as needed.

In another embodiment, Tiles and Functional Junctions may be suitable modular substrates for AI assisted design. Tiles and Junctions may be discrete functional units designed to be understood and connected by AI, as well as ordinary users. Eventually there may be thousands of Tiles available, and a user seeking to develop a Tile or Villa may ask AI, such as, without limitation, "Find me the 3 best video players compatible with my Tile."

In a further embodiment, Relational Space (RS) users may directly express their interests by placing Relational Links (locations) for their Villas. In a world filled with AI generated content and reviews, and propaganda generated endorsements, a direct expression of real user interest has real value. It is also qualitatively different than inferring user interests from interaction or statistical analysis (e.g. Facebook™ Social Graphs).

In additional embodiments, Converging and Diverging Interest Funnels may be traversed both directions like networks of interest funnels. The Converging and Diverging Interest funnels may be formed by a network of Relational Links passing to and from a Villa (or network of Villas). The interest funnels may be traversed to find people/Villas with similar or related interests, maximizing social and economic potential. Each villa may create Relational Links to every other villa of interest for its owner, which could be dozens of outbound links for each villa. Each Villa may also have inbound Relational Links from villas interested in this villa, so each Villa might average several dozen inbound and outbound Relational Links. The result may be a very complex network of Relational Links (e.g. with a few billion users, there could easily be 100 billion Relational Links or more). Each relational link may be a deliberate and specific expression of user interest, allowing users (or Villa owners) to use the links to find other users with similar interests. Interest Funnels may refer to using inbound Relational Links which may be converging toward a common interest. Consider a chess villa (e.g. lichess.com), which would share links from users interested in various chess champions (Fischer, Kasparov, Carlson), and each of the villas might share relational links with villas related to chess openings, chess coaches, etc. It might be as useful, or more, to consider diverging relational links, by starting at the lichess.com site, and traversing the links in the diverging direction to gather a list of Villas (users/owners) interested in chess.

Relational Hubs may be Villas central to a network of Villas, often sharing interests (e.g. Interest Funnels), and gain value based on their location between areas/interest networks. For example, great cities have humble beginnings. To illustrate, Chicago began as a fur trading post on the bank of the Great Lakes, growing due to its proximity to transport. Villas in Relational Space (RS) have value based on their location(s), but also because they may be on the preferred path from one important villa to another. There may be many different ways to get from one villa to another in Relational space, but these Relational Hubs may be places that people choose to travel through. In Orwell's words, All Animals may be Equal, but some Animals may be more Equal than others. So, it is with Relational Hubs. A popular Hub could be approached by another Villa, begging the popular Hub to make a Relational Link to the Villa, directing more traffic from the popular hub. Relational Space is agnostic about this. Relational Space creates a flexible context which maximizes the ways in which users may interact, and enables them to do so. Whatever arrangement a user makes with the Villa is between the user and the Villa.

In some embodiments, Tiles have Breakaway Design-Time Instruction/Installation Manuals/Modules. All necessary guidance to the user during the design/installation/configuration phase of Tiles and/or Villas may be provided, but this overhead is not needed during Tile operation. Instruction manuals may be usually discarded after the appliance has been installed. The resources may be referenced later, if needed.

Loosey Goosey Typed Inputs/Outputs-saying that inputs/outputs may be typed does not mean that they must all be strictly typed. Some connections may be strictly typed, others may be more promiscuous, depending on the guidance intended by the designer/user/owner.

Summary of Design Intent—to create an application/development environment in which users may own Villas (homes), the center of their unified identities, with the world centered around each user villa (user centric web). Villa owners may manage their communities, with ideal locations maximizing the potential for interaction, and the Functional Junctional Mosaic Terrain (FJMT) maximizing the creative potential of every user. The FJMT may allow a user to combine several prebuilt Tiles for complex functions, adding the pieces he is able to create on his own, to produce a finished Tile or application, dramatically lowering the threshold for creating something useful. A user in extreme poverty may be a participating owner with just a cell phone. Modular design of Tiles and junctions may enable AI assistance, even for ordinary users.

A Villa Owner has Authority over his Villa and its Community:

A Villa owner decides where, and who, may locate Villas own by others in the owner's Villa/community. Every Villa within the owner community is there with his consent, and Villas who do not live up to community (or owner) standards may be ejected from the Villa/community. Compliance with community standards may tend to promote harmonious communities. Some Villas may decide not to locate in a community, due to the speech or conduct of its owner. A Villa placed in a community is there with the consent of both community owner and the Villa owner. By definition, communities exist through the mutual consent of the community members and Villa owners. Censorship and other conduct in the community reflects agreement between the community owner and its members. A large company, school or government department may have a large Villa, or more specifically, a Villa of Villas (hierarchy of subordinate Villas), breaking multiple layers into bite size pieces, suitable for handling on any device, including cell phones. The splitting may guarantee that the resulting pieces may be small enough to be contained, and serviced at high speed, by a single server.

Transition to Metaverse/Social Worlds:

A Relational Space (RS) may redefine the terrain of the web, creating a new environment in which social media giants lack the advantages which help to preserve their dominance. But great empires have great inertia, and may not fall overnight. For example, Rome was not built in a day, and may not fall in a day. Even if there was a magical day when everyone saw the exact nature of the next generation of web, it would take decades for existing sites and user loyalties to move to the new model. Many users may never migrate.

Relational Space (RS) may allow the redefinition, but it has been accepted that many people may never move to the new model, and most may move only partially, for decades.

Relational Space is designed to coexist with the current websites, integrating them and making them accessible from Relational Space. There is a place in RS for old-style websites, exactly as they are, even if they and their users never change. In Relational Space, users have a chance to change, and to accept change, at their own pace.

In some embodiment, Relational Terrain (RT) is Designed to be a Shield and Sword for Social Media companies needing to move billions of users to the next generation. As a shield, RT protects current customers and moves them safely into their own Relational Space Villas, with increasing capability where they may remain loyal as technology evolves, because Relational Space is device and tech agnostic. For example, without limitation, once users may be safely tucked into their Villas, they may be proud of their own homes and want to store ALL of their things there, including any links to competitors' social websites. The MediaStream™ Tile is not perfect, and competitors may still have a technical edge on it, but it is roughly 80-90% of what users need to efficiently interact with friends. And everything on MediaStream™ that belongs to the user, stays in his villa. Over time, users may gradually move more activity from social media competitors to their Villas. Relational Terrain is an offensive sword as well.

In other embodiments, beyond allowing a user to create and curate a Villa and its community, Relational Terrain and its Functional Junctional Mosaic Terrain (FJMT) is an application environment facilitating user creativity and development, enabling users to build useful Tiles and applications with low code/no code techniques. Even more sophisticated users with programming skills benefit from starting with modular Tiles to provide most of the generic functionality, adding their own touches to complete the creation. Relational Terrain is designed to be a bridge to the next generation (Metaverse/Social Worlds), with incremental transition, agnostic and compatible with new software and hardware technologies. Relational Terrain defines the social network connecting users, whatever hardware and software they may be running, decades into the future.

In additional embodiments, once created, a user's application may be immediately visible and available, which allows users to travel along Relational Funnels to explore their interests.

A Mosaic Terrain may start with a rectangular Tile. The Tile may contain one or more other Tiles. The single Tile may contain or combine with other Tiles to create something more complex. The same idea makes LEGOs accessible to young children. Building structures from discrete, reproducible and removable components (Tiles) means that Tiles may be seen as valuable in one place, and used elsewhere. This is also true of useful combinations of Tiles (Tiles may contain other Tiles), creating a new Tile, which may be used, and improved, by others.

Mosaic terrain may lower the creativity threshold to the point of simply forming a useful combination of Tiles within a Tile, creating a new Tile which may be used by others. Ordinary users may participate at this humble level at first, but may improve their skills and creativity by copying and learning from others. For example, one of the most important things a child may learn is a lack of fear in exploring their potential.

Tiles may not be simple gray bricks, building long blocks of Soviet style apartments. Tiles may be richly customizable by users through attributes including, without limitation, length, width, color, and may contain images, video, and/or text.

Relational Tiles and Mosaic (Relational) Terrain may be designed as a way for users to build their own homes and harmonious communities, maximizing social interaction, ultimately enabling complex social worlds (e.g. "Metaverse"). The structural and functional characteristics of the homes may be fashioned to enable users to do that. For social game designers, the job is to create an interesting environment in which users may express their creativity through interaction with each other. For instance, provide a group of kids with a large box of toys and let them explore and negotiate with each other how they want to play. Enforcing a strict set of rules limits their expression and fun.

A playground may be provided in which humans may interact, explore and express ideas, without specific expectations about what form that may take. For example, Hermann Hesse offered an elegant model in Magister Ludi (The Glass Bead Game). Douglas Hofstadter presented a more modern take in Gödel Escher Bach.

RS is designed and intended to use current hardware including cell phones to move approximately 95% or more of the billions of social media users into RS creating persistent real estate network value before hardware intensive solutions may compete to claim land. RS is metaverse for the masses, not the elites. The primary value of metaverse and RS is creating a large number of user homes with harmonious communities and networks of social relations. Using ordinary hardware gives RS First mover advantage in this land rush, allowing its users to lay claim to the most valuable locations, even with "inferior" hardware. Although RS and the metaverse is infinite, the most valuable locations, relational hubs and networks may be claimed long before hardware intensive solutions may bring meaningful numbers of users. It is hard to win a real estate contest by coming to populated areas offering to build more beautiful structures of higher "quality". Actual villas and structure may change, but relations and networks built today may dominate for decades.

Figure 4:
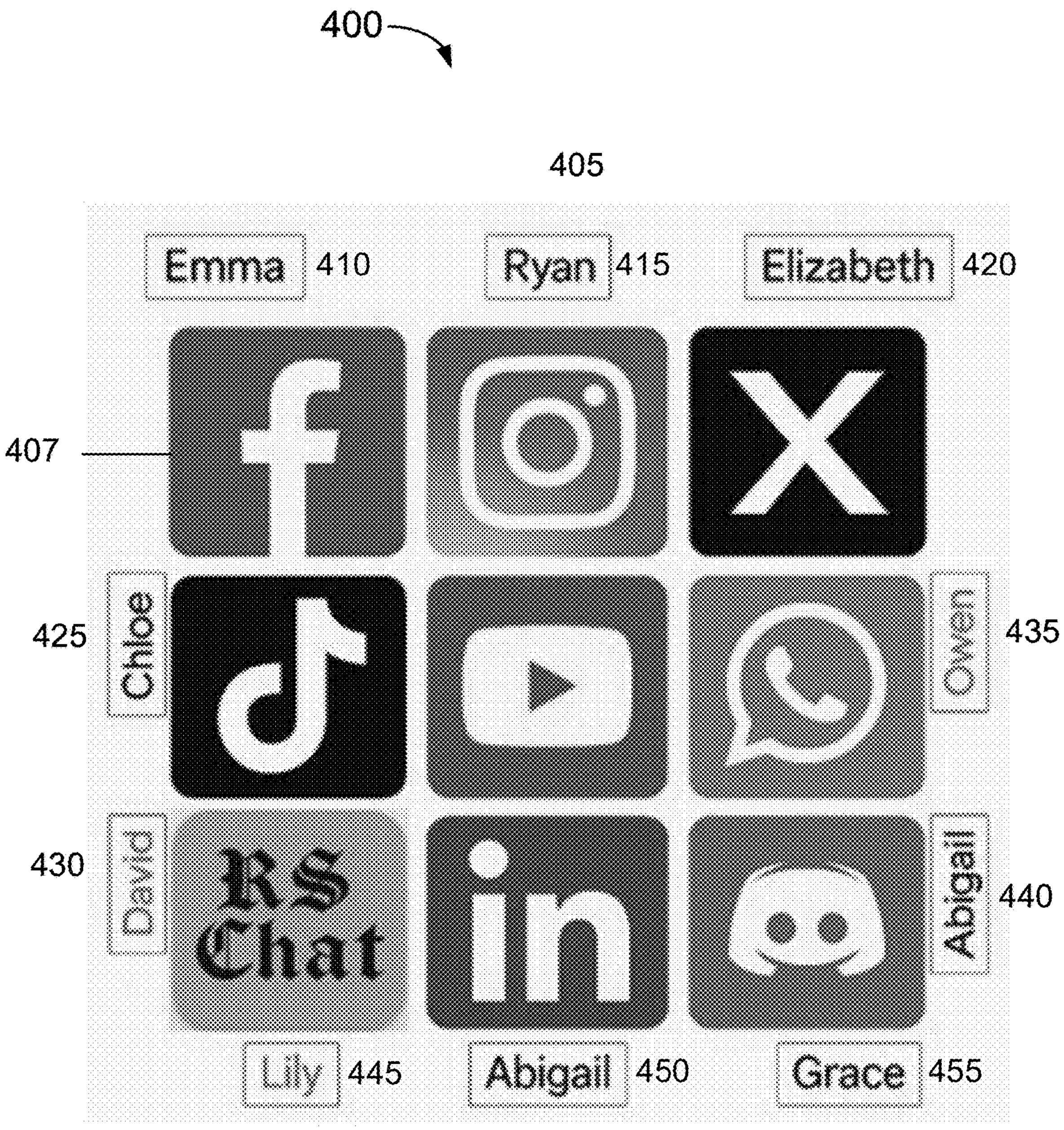
FIG. 4 is an illustration of an exemplary Relational Map Villa with a Social Media Home Page Tile, in accordance with an embodiment of the present invention.

FIG. 4 is an illustration of an exemplary Relational Map of Villa 400 with a Social Media Home Page Tile 405 and external Villas 410-455, in accordance with an embodiment of the present invention. In one embodiment of the present invention, Relational Links on Relational Map 400 may show other Villas 410-455, and links to social media 407 such as, without limitation, Facebook™, X™, TikTok™, YouTube™, WhatsApp™, appear in, for instance, the Relational Map of Villa 400. Links may place Villa 400 adjacent to other Villas 410-455, and conversely, place other Villas adjacent/within Villa 400 and Relational Map. The Relational reciprocity means that Villa 400 could show up on the Relational Maps of the other (external) Villas, although some of the other Villas (e.g. Facebook™) may have many Villas adjacent to theirs, and not desire to display all of the many Villas on the other (external) Villas Relational Map. Similarly, a Villa owner (e.g. Valerie) may choose to place Villa 400 next to other Villas 410 415 420, and for a variety of reasons, including privacy, may elect to not have Villa 400 displayed on the Relational Map of the other Villas 425-455. The incognito Relational Links may allow one or more Villa(s) to be within Valerie's Relational Map, including an Inner Sanctum Tile, without displaying her association to the world at large. Other Villas may choose not to allow Valerie to associate with their Villa, and some may choose to not allow incoming incognito links to their Villa.

Relational Links may be to a specific Tile within a Villa, or to the Villa in its entirety. Often a Villa owner may decide to have a specific Tile as a place where incoming Relational Links (e.g. Villas) may appear on its Relational Map. In such cases, the owner of an incoming Villa may decide whether to display the Villa on its Relational Map as the symbol for the entire Villa (e.g. Facebook™) or as the symbol for the individual Tile to which they may be linked within that Villa.

Relational Space (RS) may split complex structures and functions into bite sized pieces, easier to handle on smaller displays. Villas may be formed from one or multiple Tiles. Tile functionality may be split into multiple junctions. AI may be enlisted to assist in assembly and connection. A relational Tile (commonly Tile) may contain other Tiles. (Relational) Tiles are relational because they are able to connect to other Tiles using Relational Links, establishing multiple simultaneous locations. Villas are user homes which may contain one or more (Relational) Tiles. Villas are probably also Tiles, since they may connect to other Villas/Tiles using Relational Links, establishing multiple simultaneous locations like (Relational) Tiles. Relational Terrain is a non-fixed terrain system linking numerous land masses (Villas and/or Tiles) using Relational Links to establish multiple simultaneous locations. A collection of all Villas/Tiles capable of directly connecting to each other is a Relational/Social world. Relational Terrain for Social Worlds, may indicate there may be multiple social worlds which can be isolated from each other. Likely, this would occur when a new social world is created, deliberately separate from an existing social world. For example, a Chinese company could create a Relational/Social world to serve the world at large and have a second social world to serve only China, since the Chinese government insists on isolating its people from other countries. Within a social/relational world, what does the map of that world look like? The answer is that there is no single map of a Relational Terrain—each Villa has its own Relational Map, of the villa itself, and the villas/Tiles that are related to that Villa. This is a powerful simplifying concept, since Relational Worlds are infinitely expandable, with billions of villas, a map of the entire world would be infinitely large, a nightmare to handle. But for any given Villa, its Relational Map is strictly limited to Villas connected to the Villa. And, other Villas do not exist, from the perspective of the Villa, and its Relational Map which shows the entire world, as it relates to the Villa. A similar thing happens with "Relational Space", which is often treated as a synonym for MY social world, and the Villas within it may connect directly to each other. From their point of view, "Relational Space" is like "the Universe" or "the Metaverse"—the only Universe or Metaverse that matters or exists is the Villa that one is a member. Other Universes or Metaverses might exist, but since the Villa cannot connect to them, they do not exist.

Everything is a Tile-Tile based language for building, expression, creation and social interaction. Functional Junctions may comprise one or more input(s)/output(s), Villas may comprise one or more Tiles, Personas may comprise one or more Tiles. Personas may comprise one or multiple functional junctions. The "simplest" element is the junction, with a process separating input(s)/output(s), enabling design and even programming at the simplest level possible. A Tile may get displayed in a particular way, and fills the space it is given. A Tile Editor may be used to edit Persona Tiles, Villas and Functional Junctions, which are all Tiles.

To create a library of Tiles for a specific purpose, start with a single Tile. Place a bunch of other Tiles into the single Tile. The inside Tiles may be linked to each other using functional junctions. Tiles may have just data. A Tile may include, without limitation, a DatabaseTile having functional junctions that may be attached to other Tiles.

Relational Space (RS) is not just a social network, comprehensive online worlds with user owned homes and communities with business, educational, marketing (visibility), development and enablement of human (creative) potential. RS is a value proposition for users. Home Ownership, Freedom, Sovereignty and control, creativity, visibility, marketing, Development, creative potential.

One to many social relations may be represented with one-to-many relations between user homes (villas), if the goal is to represent and facilitate social relations. A villa with around 20 relational links to other villas not only has villas nearby for convenience, the villa is also a member of around 20 communities, each with dozens or more people sharing interests.

Analysis scope on junctions may dump expected input and output schemas in design mode, a secondary check on compatibility, beyond simple "type". The type could have been set long ago, and the actual behavior of the junction may have changed since then.

Tiles may be bought and sold, including their active Relational Links. A functioning Tile that is shared by reference in many locations may become extremely valuable, when sold with its junction connections.

Relational Space (RS) has no cannibals. A social media company with billions of legacy users may worry about losing users to its own competitive Relational Space. The users have been safely migrated into the future, not eaten by cannibals. This is the intended effect of Relational Space (RS). The good news is that RS may capture users from all of its competitors by giving them what they cannot get from their current platforms.

Encapsulation of entire apps in RS by adding junctions to link to RS, creating courtesy Villas and Tiles in RS for external websites/pages/webapps. This is an Interim expedient solution to facilitate their functional availability from RS. Offensive potential of building "courtesy" Villas/Tiles may become as a way to compel other websites to create their own "better" RS Tiles/Villas. Courtesy Villas/Tiles may be used to track traffic from RS to these apps/websites.

A patent protected version of the Metaverse (e.g. RS™ Metaverse), may become a specific product owned and produced by a single company. In a way, it is not subject to competition because nobody else may produce it. Other (generic) Metaverse variations may be produced, but none of them may be (for good or bad) RS™ Metaverse. A store may sell many different cola drinks, but there is only one Coke. It may only be produced by one owner, and its quality and characteristics may be known and respected. Similarly, an RS user similarly has a unique brand. To illustrate, "Valerie253@RS" is a single individual, with a single RS home, where her unified identity (i.e. brand) is located. She may choose to have accounts/pages on other websites (Facebook™, X™, TikTok™), but her unique individual brand is located in a single Villa, and her brand and villa/community belong to Valerie253. Just as brands may be important to companies, a single brand and home/community are important to individual users.

Several major companies recognize there may be a new web generation, (for shorthand let us call it Metaverse), and may be competing to present their version. Defining the terrain in the RS portfolio allows its owner to have First Mover advantage to deploy and populate the RS™ Metaverse. Other companies may have their own Metaverses, but they cannot have the specific features of RS and may succeed or fail based on that. RS Owner has first mover advantage in the RS™ Metaverse.

RS ownership effectively owns the terrain defined by its patents, allowing exclusive control for the management of resulting networks and interaction with RS users. In the absence of an owned terrain, a Metaverse company is competing for users. RS portfolio provides enabling guidance toward useful path(s) but does not require all of its details if better approaches may be discovered.

RS terrain definition provides unique protection and encouragement for the users of its owner to migrate from existing social media to RS terrain. In the case of users on RS owner's legacy platforms, this serves as a Shield to protect the users' relationship with RS owners as they move to RS. For users on competitive platforms, RS offers a new bargain, encouraging transitional migration to RS as that makes sense for each user (the Sword).

Relational Space is devoted to the pursuit of individual sovereignty and freedom. Governance, when needed, should be as close to the individual as possible, in the villas, which may be governed by mutual consent. Imperfect as individual and villa governance may be, it is sometimes far preferable to the classic curse "I'm from the government and I'm here to help."

Tile Internals: Balancing Complexity and Accessibility to RS.

While RS emphasizes no-code assembly through typed junctions and AI guidance, to simplify connection by ordinary users, individual Tiles may incorporate traditional programming techniques internally. There is no limit on the internal complexity of Tiles, equivalent to any in current social media apps.

Just as a washing machine hides intricate electronics behind simple controls, or an iPhone™ enables child-friendly use despite its sophisticated codebase, RS Tiles may allow developers to embed complex logic (e.g., algorithms, APIs, or full scripts) within a Tile's structure. This enables encapsulation of existing applications such as, without limitations, social media tools or data processors without rewriting from scratch, while maintaining external simplicity for end-users.

Moving apps to an intrinsic RS architecture may provide a quick way for a social media company with a large user base to make their full capability available within RS and encourage the migration of users from their legacy platform to RS. Migration is encouraged but not compelled. Users may be provided an opportunity to reach for the benefits of RS, accepting them at their own pace. The incremental user driven transition is a key design feature.

RS Light-Intriguing Cripples and Counterfeits:

Only one company may own RS, so others may consider using the best ideas of the RS portfolio, without the core elements protected by the patents. To maximize the power of these cases, consider them in the hands of a social media giant, with billions of users, and relatively unlimited financial and technical resources. They may not be clones or copies, because they are not identical. It is a little bit disrespectful to say they may be aping Relational Space. Better to call them knock offs or imitations, but still intriguing. A Chinese Rolex or Polo shirt may look quite nice.

An RS Light Space could have user homes, built from Tiles and having "Light links" which do not place user villa in multiple locations, even using fluid mosaic terrain, as long as it avoids the game related specifics of FMT patent. User home could have a unified identity for user (a single place to locate him and his Light links) and could create a user centric web with Light links to locations of interest. User home could store user data, including contacts and interactions, if they occur in RS Light. Home could be stored on a single server, like RS villas. It could be tech agnostic, like RS, so that it may adapt to future technologies. RS Light is a quite amazing package, and all of it has been placed into the public domain with the RS patents themselves.

An RS Light home has one location and may not be part of multiple communities at the same time. Similarly, an RS Light home cannot form communities like RS, because RS Light homes have single locations. A user community is the homes that happen to be around on the RS Light global map. RS may define Relational Maps which may be specific to each villa and stored on each villa server.

Universal Domination:

RS maximizes social interaction and visibility, combined with flexibly designed user Villas and harmonious communities. RS is naturally seen as the next general social media—social worlds—or metaverse. RS aspires to much more. Tech agnostic means RS interfaces seamlessly with the current internet, including social media (and other apps) allowing an incremental transition from where users may be where they want to be in the future. RS encourages user migration to RS, without compulsion, at their own pace. Tech agnostic also means it interfaces with the next tech generation, and the tech that follows.

RS may not be committed to FJMT. It is a very exciting technology, enabling ordinary users to design, modify and create their own villas, communities, and apps. It is part of RS now, because it is (agnostically) the best tech available for its purpose. If something better than FJMT arises in the future, RS fully intends to support that as well. RS avoids commitment to tech fashions, because fashions go out of fashion.

RS is committed to eternal truths—these are not tech, not fashion that may come and go. People may be social and crave interaction. People love to own their homes, a place to relax and have fun, a place to build a business, a place to spend time with friends and family. People love freedom—of speech, of expression, of conduct. People love to create, each in their own way. These bets may be easy to make, because they have always been true. People love privacy under their control. People hate it when others mess with them. When rules need to be made and followed, it should be as close to the local level as possible—in RS, that is mostly in the villas, governed by mutual consent. RS bets on these eternal truths-if they fail to be true in the future, RS may be unfashionable but still devoted to these ideas.

Combining all of these personal freedoms with a tech agnostic platform means few limits to what users may do. RS may be used for personal villas, business villas, company villas, government villas, school villas. Since there may be few limits on villa design, some villas combine personal, business, recreation, creativity.

Over time, with all of the flexibility, connectivity, visibility, freedom and user interaction, RS may become THE place to be online. People may identify with their single RS address which has their unified identity. Because of the visibility, interaction and relations, RS may become a destination for developing apps. A young developer who creates an app may instantly have a way to publish or sell it. The internet may always be necessary as a way to transmit data, but RS may replace the internet for many because RS is where their home is, and the entire RS is centered around their home. The value in RS is in the user homes and their network of social relations and interactions—that eternal truth may allow RS to become dominant, and remain dominant, for generations.

Relational Space (RS) sounds singular, but it may represent an unknown number of social worlds, with one dominant global social world that most may identify as Relational Space. But other worlds using Relational Terrain may also be constructed by countries, regions, and large companies. RS does not make predictions or restrictions on what forms these social worlds may take, that is left up to those who own and create them. But movement between the worlds is seamless, just like movement to/from the ordinary internet. So Relational Space may be more properly seen as a universe, containing and integrating all of these worlds. RS may become dominant until the patents expire, and perhaps for decades after through ongoing development.

Figure 5:
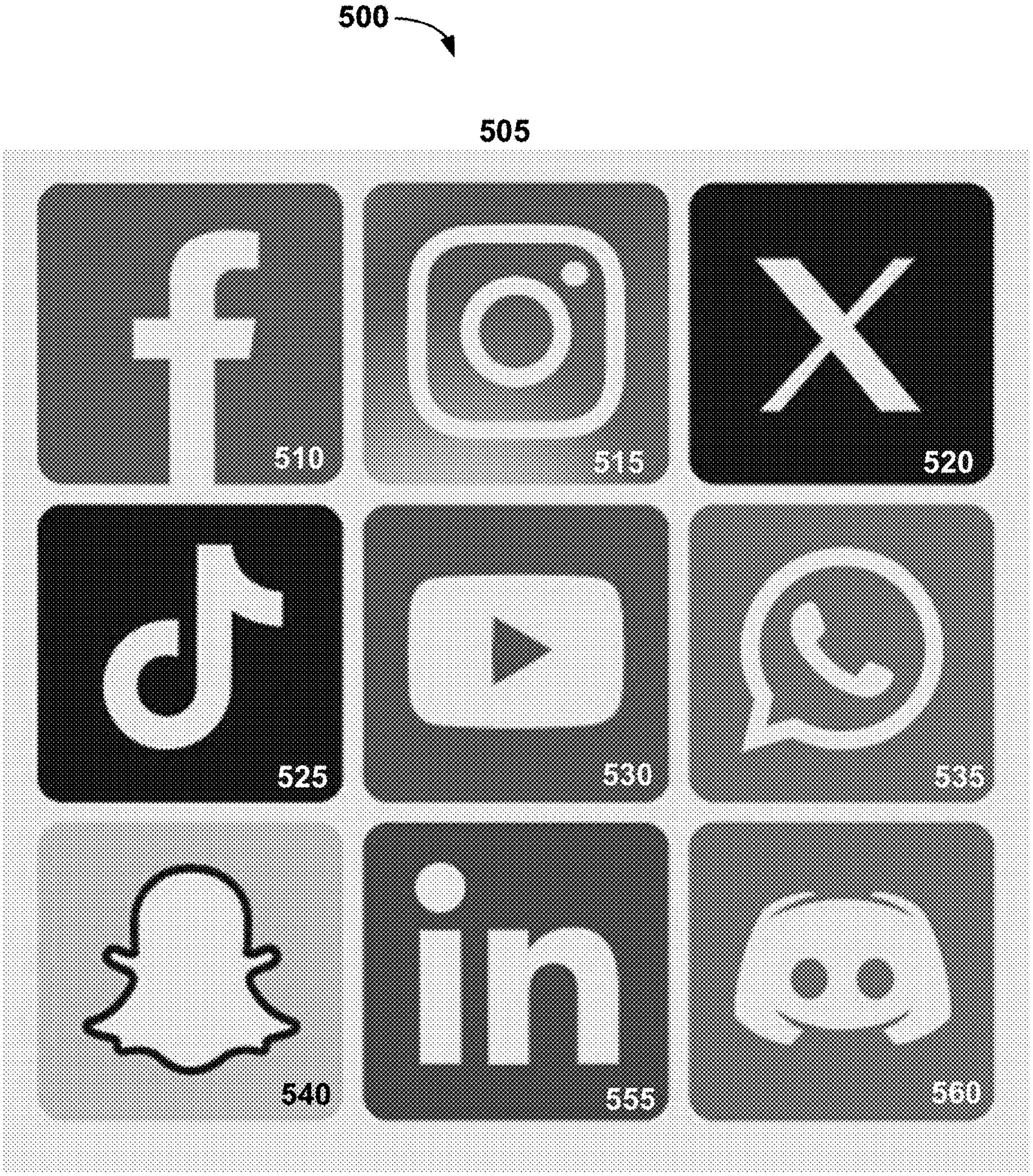
FIG. 5 is an illustration of an exemplary Relational Map Villa with a Social Media Home Page Tile and multiple Villas, in accordance with an embodiment of the present invention.

FIG. 5 is an illustration of an exemplary Relational Map Villa 500 with a Social Media Home Page Tile 505, in accordance with an embodiment of the present invention. In an embodiment of the present invention, Villa 500 has Relational Links to social media websites 510-560. The Villa (home) owner may insist on exclusively using these websites, using none of the communication Tiles in RS. The owner's RS home page 500 may give a uniform experience on the cell phone, tablet and desktop displays. The owner may never want to use the special features of RS. The owner may just want a free online home page—that may be just fine in RS, which is a flexible transition to the future, allowing user adoption at their own pace.

Figure 6:
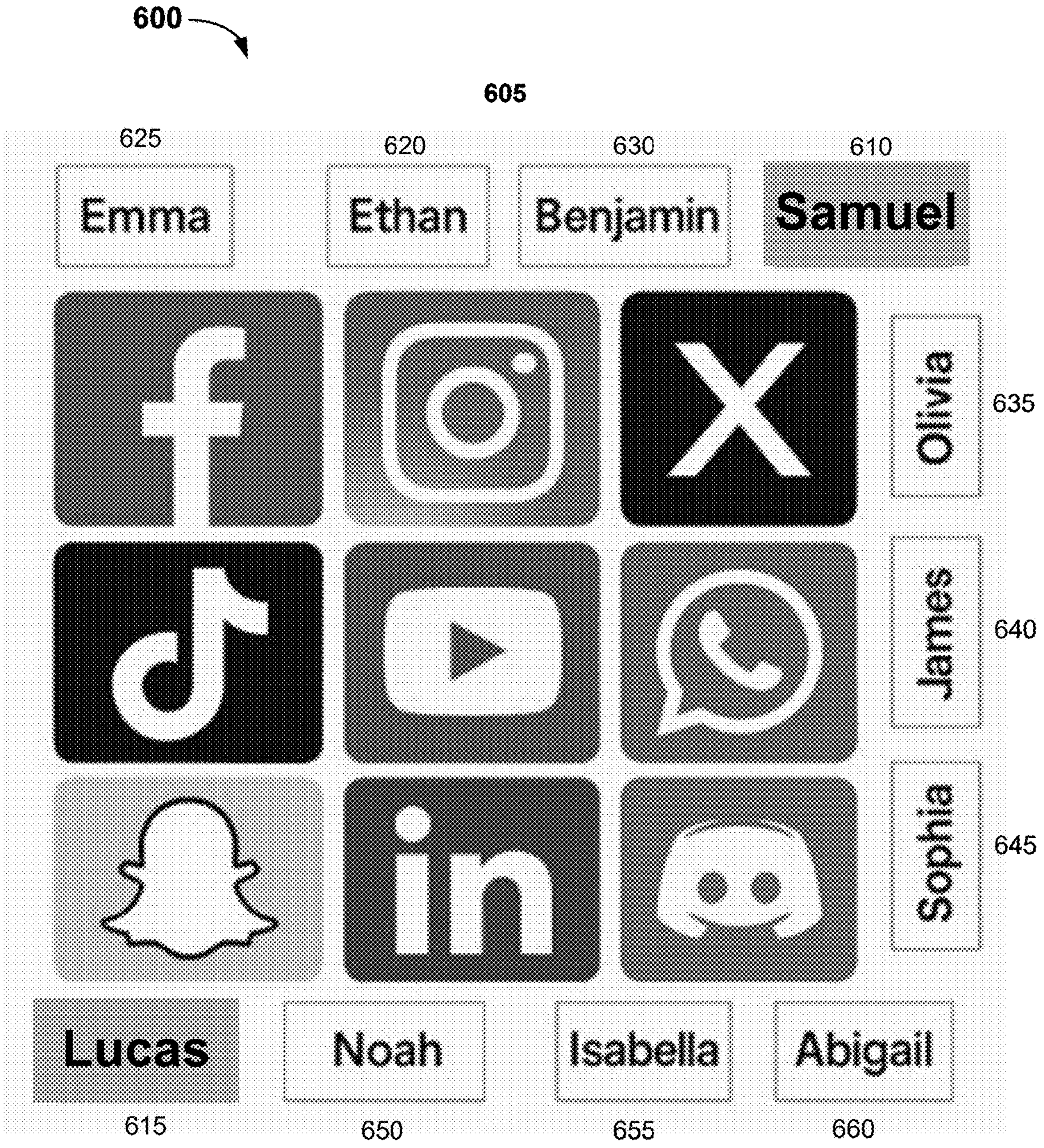
FIG. 6 is an illustration of an exemplary Relational Map Villa with a Social Media Home Page Tile, in accordance with an embodiment of the present invention.

FIG. 6 is an illustration of an exemplary Relational Map Villa 600 with a Social Media Home Page Tile 605, in accordance with an embodiment of the present invention. In one embodiment of the present invention, Villas 600 may be Online Homes with Unified Identity. The Villa owner may consider this an online home. The floor plan may be the same. The Villa is where an owner lives online and keeps all her stuff where the owner has unified identity including, without limitation, all of the links to social media websites (using Relational Links) so these may be directly within their Villas/communities. A Villa also provides a community for their friends, colleagues, family to locate their Villas and interact. Rather than giving a friend his/her Facebook™ page, he/she may give his/her RS page such as, without limitation, "Valerie246", where all of her (public) social media links may be found including, without limitation, X™, TikTok™, Facebook™, WhatsApp™, mail, etc.

Villas 600 may be online homes where users may place their unified identity, including all of their links to social media websites (using Relational Links) so these may be directly within their Villas/communities. A Villa also provides a community for their friends, colleagues, family to locate their Villas and interact.

The Villa may be a place where friends may locate their Villas. The Villa forms a community of Villas that may be related to the homeowner-friends, coworkers, classmates, family. The owner may look out the front window and click on any Villa the owner wishes to visit. From Valerie's view, the web may be arranged around the home-"User Centric Web".

Villas may have Multiple Simultaneous Locations.

A designer may locate the Villa near the school, and near friends, and near shopping sites, and near parents and siblings Villas, all at the same time. It may be more than placing a bookmark to these locations. The designer may actually be placing the Villa in these locations, so when you go to the Relational Map for all of those Villas, you may see the designer's Villa there. Because the Villa is a permanent part of ALL of those communities, at the same time. The designer may be able to see the entire world, as it may be important to her, from the Villa. And all of those people and Villas may see the Villa as well. In Relational Space, the world may be centered around the Villa, and every other Villa, at the same time. A User Centric Web where each Villa may have multiple Relational Links (e.g. simultaneous locations), allowing all of the owner's interests to be brought into the Villa and its community. Each Villa may have multiple Relational Links (e.g. simultaneous locations), allowing all of the owner's interests to be brought into the Villa and its community (e.g. User Centric Web). At the same time, each Villa may be a (potentially permanent) member of multiple other communities.

Socially Connected Villas-RS may include, without limitation, a socially connected Villa. Villa 600 may include green/highlighted names 610 615 in some of the Villas around the designer's Villa. These users are in RS now, potentially available for live text or video chats, playing games, etc.

Customizing Villas-gradually the designer may learn about chat features available directly in RS. The designer may discover Tiles which use the MediaStream Tile, highly configurable to many different social functions, essentially a free format message board allowing text, photos, videos, etc. Even if it is not quite as good at things that Facebook™ and TikTok™ do best, all contacts, interaction and data are stored in the RS Villa, outside the reach of other companies. The designer may decide to replace the SnapChat™ in the Villa with RSChat™.

Figure 7:
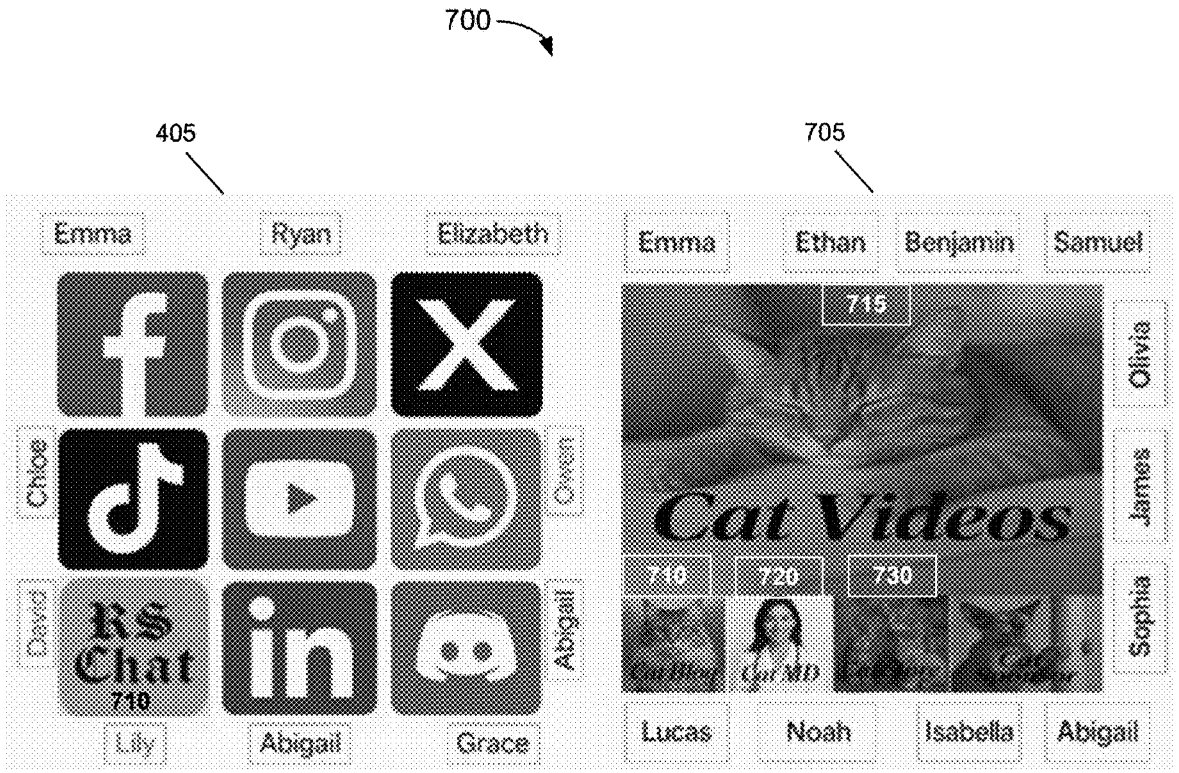
FIG. 7 is an illustration of an exemplary Relational Map Villa with a Social Media Home Page Tile and a cat video Tile, in accordance with an embodiment of the present invention.

FIG. 7 is an illustration of an exemplary Relational Map Villa 700 with a Social Media Home Page Tile 405 and a cat video Tile 705, in accordance with an embodiment of the present invention. In an embodiment of the present invention, Villas 700 may have Multiple Tiles 405 705. A major advantage of RS is that Villas may be any size/shape, with any number of Tiles. So far, a single Tile for each Villa has been shown (although any Tile may contain multiple smaller Tiles). Each Villa Tile 405 705 may also have associated Villas in and around it. The Villas may be Villas of other users who have chosen to locate their Villa within the Villa community, so these Villas may show up on the Relational Map of Villa 700. Incidentally, the Villa may show up on the Relational Maps of their Villas. For instance, if I am your neighbor, you are my neighbor. A Tile may be a functionally inert "black box" if it has no functional junctions. Junctions are how a Tile communicates/connects with other Tiles/Villas, and even how it communicates with the user. It may be unknown for certain whether each of the Tiles has functional junctions, since the Tiles are typically not visible to the user. However, virtually all of the Tiles have (probably multiple) functional junctions. For example, the Tiles in the left major Tile 405 are social media links, so they have a junction with a typed input involving User Click which may execute its process, and almost certainly connects to another Tile which is the encapsulated Tile for each of those social media websites. This causes the user to go to the external website, do what he wants there, and return at the end to the user Villa. The Tiles within the right Tile 705 may likely respond to User Click, either connecting to another Tile, or possibly blowing up the displayed Tiles to full screen size, and changing the image to allow live interaction with Cat Blog 710, Cat MD 720, Cat Store 730, etc. Similarly, the user villas shown around the periphery of the large Tiles are small Tiles with user names, not the villas themselves (since each has larger Tile(s)), but clicking on these Tiles would take the user through a Relational Link to the associated Villa, where user would see a Relational map of that villa, and user could engage in various activities, likely eventually returning to the current villa.

In some embodiment, the Villa owner may start making cat videos on YouTube and start a cat blog on SubStack™, and sometimes would refer people in the blog or videos to Amazon™ to buy cat toys or food, for a small commission. Over time, the content may become popular and increasing numbers of people may be viewing her videos and reading her blog, enough that the owner may be making pretty good money from Amazon™ commissions. After a while, the owner may realize to make a new Tile 705 for the Villa, related just to cat stuff, and incorporate a store 710 directly in Tile 705, to make a large profit on each sale, and may pay a modest commission to the RS owner.

Villas 700 may Change over Time, Like People and Relationships. Consider all the Villas actually belong to a single user, like "Valerie246", at different points in time. Referring to FIG. 5, the first Villa 500 may be the initial home page, with links to social media sites 510-560.

After a while, the owner became more familiar with RS and made the Villa an online home. The floor plan did not change, but the way the Villa was used and how the owner regarded the Villa changed. The owner's friends may have changed the way they regarded it as well, and some decided to locate their homes near/in the Villa. Villa 700 is now a community of people/Villas who share an interest in Valerie246 (e.g. owner). In making new contacts, a single home address is given, namely, "Valerie246", in Relational Space, which has her "unified identity". Referring to FIG. 6, the "Relational Map" of Villa 700 shows the world, from the point of view of Valerie246. Somebody visiting Valerie's Villa 700 would see all of the other people/Villas 610-660 sharing an interest in Valerie. They are more likely to share other interests as well-her school, family, friends. A user may click on Ethan's Villa 620 (which is part of Valerie's community/Villa 600), and they would go to the Relational Map for Ethan's Villa 620. Ethan's map 620 would show the world, from Ethan's perspective, which may be different from Valerie's Villa 600.

As Valerie becomes familiar with the social connectivity of Villa 700, referring to FIGS. 5 and 7, Valerie may improve Villa 700 by replacing SnapChat™ 540 with a Relational Link to RSChat™ 710, the MediaStream™ based Tile in Relational Space which has much of the functionality of many social media websites. Is RSChat™/MediaStream™ "as good as FaceBook™, Tiktok™, X™"? In Valerie's mind, that's why she leaves the links to those in her Villa 700. But the integration of RSChat™ 710 with her RS Villa 700 has convinced her that RSChat™ 710 may be more deserving of space in her Villa Tile 705 than SnapChat™, which she replaced. Different users may make these decisions differently, sometimes the same user may change their mind (and their Villa) as time passes. Relational Space and user Villa is there to reflect the user, as the user and user relationships change over time.

As Valerie's cat videos 715 and blog 710 became popular on YouTube™ and SubStack™, she realized she could be more successful (and profitable) by creating a new Tile 705 for her Villa 700 devoted to these activities.

By way of illustration, a sponsor noticed the success of her cat Tile 715 and offered to pay her to place a Sponsor Tile 720 in her cat Tile 715, initially with sponsor having control over contents in the Sponsor Tile. Valerie needed the money to save for college, so she agreed. As her cat Tile 715 became more popular, other sponsors wanted to pay her as well, and she decided to rotate sponsors through her Sponsor Tile 720 (no longer exclusive to the first sponsor, since Valerie now has more leverage). The first sponsor became upset and made demands that Valerie found unreasonable. As her Villa 700 and its cat Tile 715 became more valuable, Valerie became more powerful. She decided to give a "gentle" boot to the first sponsor, which she could do, because she owns the Villa and curates content, sponsors and member Villas. Her Villa is her castle, and she is queen in Relational Space.

Harmonious Communities:

RS communities are created within the Villas. Each Villa owner decides who may be allowed to place their Villa within the owner Villa. Those placing their Villas join the community and accept the stewardship of its owner. The Villa owner sets the balance between free expression and civility. The owner who kicks out Villas may create an oppressive community, but an owner who fails to enforce a code of conduct may allow chaos. In RS, Villa owners may set community standards, and censorship may be decentralized.

Figure 8:
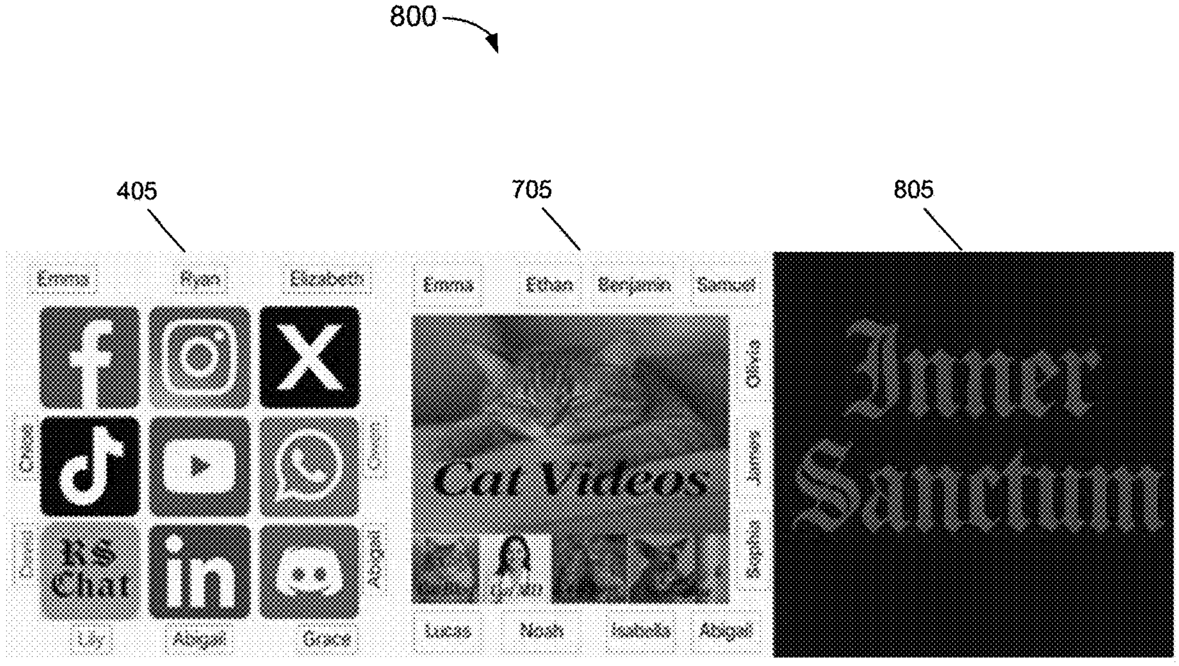
FIG. 8 is an illustration of an exemplary Relational Map Villa with a Social Media Home Page Tile, a cat video Tile and an Inner Sanctum Tile, in accordance with an embodiment of the present invention.

FIG. 8 is an illustration of an exemplary Relational Map Villa 800 with a Social Media Home Page Tile 405, a cat video Tile 705 and an Inner Sanctum Tile 805, in accordance with an embodiment of the present invention. In an embodiment of the present invention, improved connectivity and social interaction in Relational Space is provided. Connectivity may need privacy. Consider a classic horror story where a teenager with hundreds of "friends" is sharing photos, videos, stories online. Relational Space may help people connect with those of shared interests, but is also fiercely protective of privacy.

Figure 9:
FIG. 9 is an illustration of an exemplary Inner Sanctum Tile comprising a private MultiTile structure, in accordance with an embodiment of the present invention.

Only the Villa owner (e.g. Valerie) may know the "Inner Sanctum" Tile, as it may be private, only for Valerie. The "Inner Sanctum" Tile may comprise a private or secret place to which few other people or no one may be admitted. FIG. 9 shows how Valerie sees the Inner Sanctum Tile.

FIG. 9 is an illustration of an exemplary Inner Sanctum Tile 900 comprising a private MultiTile structure 905, in accordance with an embodiment of the present invention. In one embodiment of the present invention, MultiTile structure 905 may be highly configurable and private. MultiTile structure 905 may be activated (e.g. by a mouse click or finger tap) through Inner Sanctum Tile 805. In this instance (e.g. upon activation), MultiTile structure 905 may be presented to the Villa owner including, without limitation, a large browsing area 910 (at the top) and a palette Tile 915 (at the bottom) containing multiple Tiles of recently visited or favorite websites, which may also be configurable. MultiTile structure 905 is totally private, in particular, for Valerie's eyes only.

Figure 10:
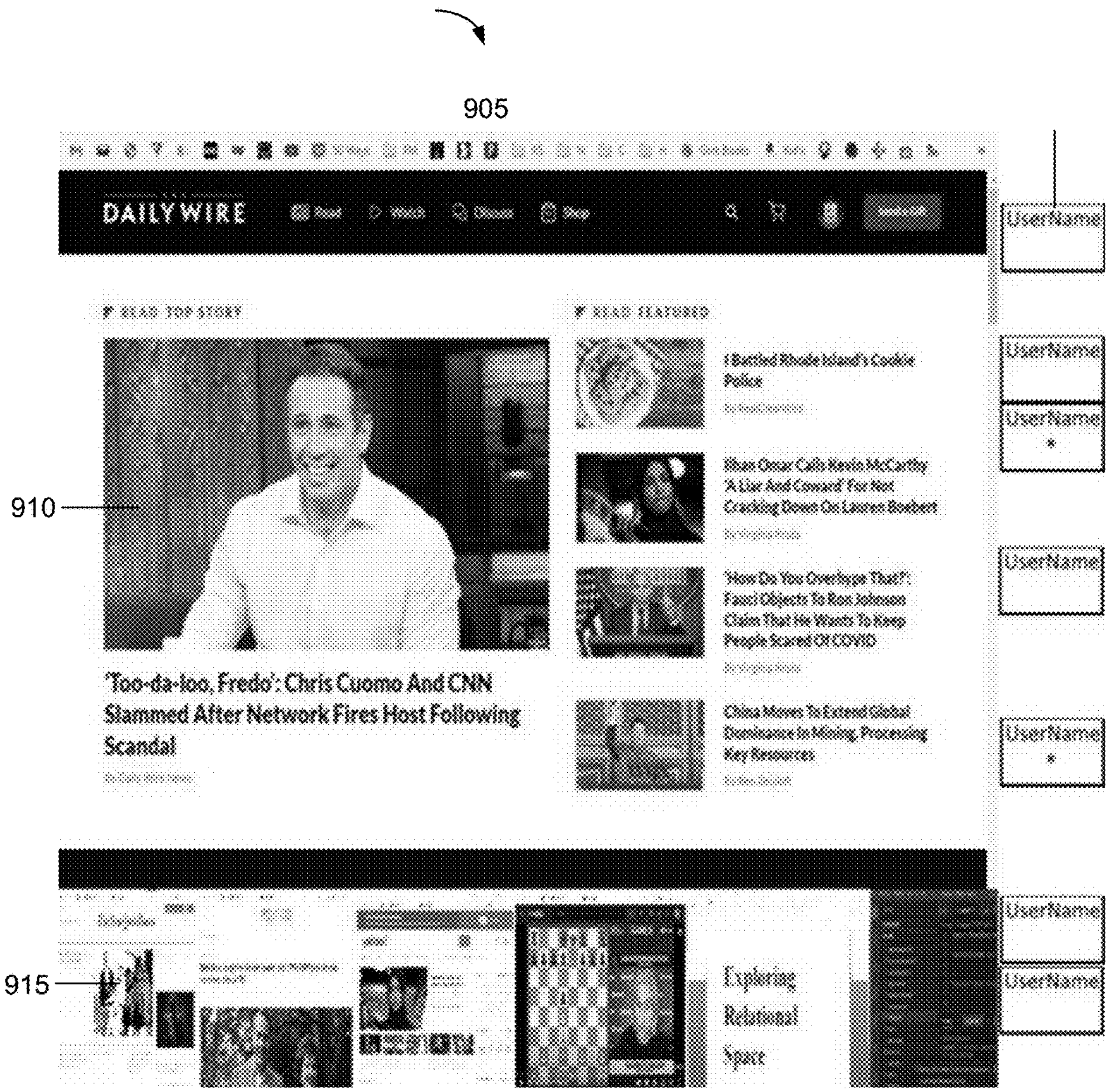
FIG. 10 is an illustration of an exemplary private Inner Sanctum Tile with Villas, in accordance with an embodiment of the present invention.

FIG. 10 is an illustration of an exemplary private Inner Sanctum Tile 1000 with external Villas 1005, in accordance with an embodiment of the present invention. In an embodiment of the present invention, there may be external Villas 1005 visiting and/or locating near MultiTile structure 905.

With a wrong privacy setting, external Villas 1005 may be seeing what the Villa owner is doing. As an illustration, the Villa owner may be living in California, so the Villa owner visiting a right-wing website may be disapproved by external Villas 1005 such as, fellow students, employers, teachers or even people the Villa owner does not know. At the bottom is palette Tile 915 with a few other political websites which could draw unwelcome attention. The Villa owner may have a chess website as well, that seems harmless enough. Better to play chess in the privacy of the owner's home, with the shades drawn. The Villa owner is learning about Relational Space, instead she was looking at her medical records. Everyone should have an Inner Sanctum Tile 1000, with complete privacy.

Figure 11:
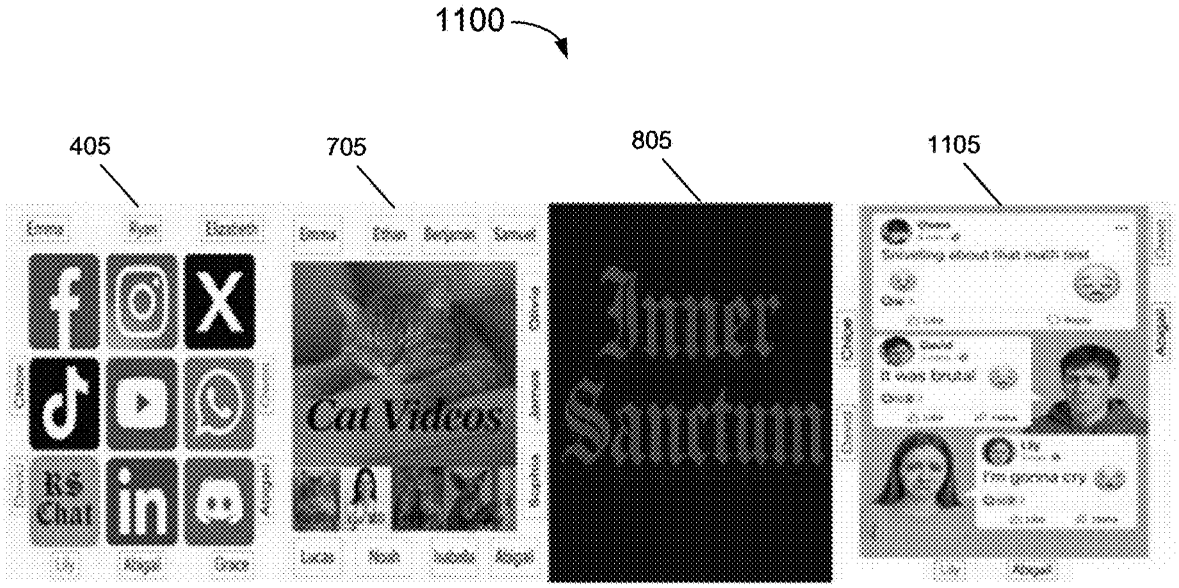
FIG. 11 is an illustration of an exemplary Multiple Tile Villa, in accordance with an embodiment of the present invention.

FIG. 11 is an illustration of an exemplary Multiple Tile Villa 1100, in accordance with an embodiment of the present invention. One of the advantages of Mosaic terrain is that a Villa 1100 may have multiple Tiles 405 705 805 1105, and the Tiles may be arranged sensibly for the purpose of selection (in a palette) and may also focus on a single Tile for its function. Tiles may be allowed to work properly on a small cell phone display, using a palette Tile and thumbnails for selection, and a single Tile may be expanded to fill the entire display in order to properly interact with that Tile. If dealing with a single large, monolithic Villa, that would be a lot more difficult on a cell phone.

Villa 1100 shows a set of four Tiles 405 705 805 1105, or more in a single line. A single Tile may be viewed, or a palette Tile, which contains four other Tiles. A single Tile of the palette Tile may fill the space it is given. For instance, if a user wants to focus on a particular Tile, the user may expand it to full display. When done with that particular Tile, user may allow the Tile to revert to its original size, and back to the palette Tile.

In some embodiment, like most Tiles, palette Tile 1100 is highly configurable. Palette Tile 1100 may handle multiple Tiles in a single line as shown, or they be split into two or more lines if that is more sensible for the shape of the display.

Figure 12:
FIG. 12 is an illustration of an exemplary Multiple Tile Villa, in accordance with an embodiment of the present invention.

FIG. 12 is an illustration of an exemplary split Multiple Tile Villa, in accordance with an embodiment of the present invention. In an embodiment of the present invention, palette Tile 1200 is highly configurable and may handle multiple Tiles in two or more lines if that is more sensible for the shape and size of the display, as shown. The palette Tile may be configured to display a window on the Tiles matching the size/shape of display. In the linear example above, on a cell phone, the palette Tile could display the four Tiles from left to right, but on a cell phone.

Figure 13:
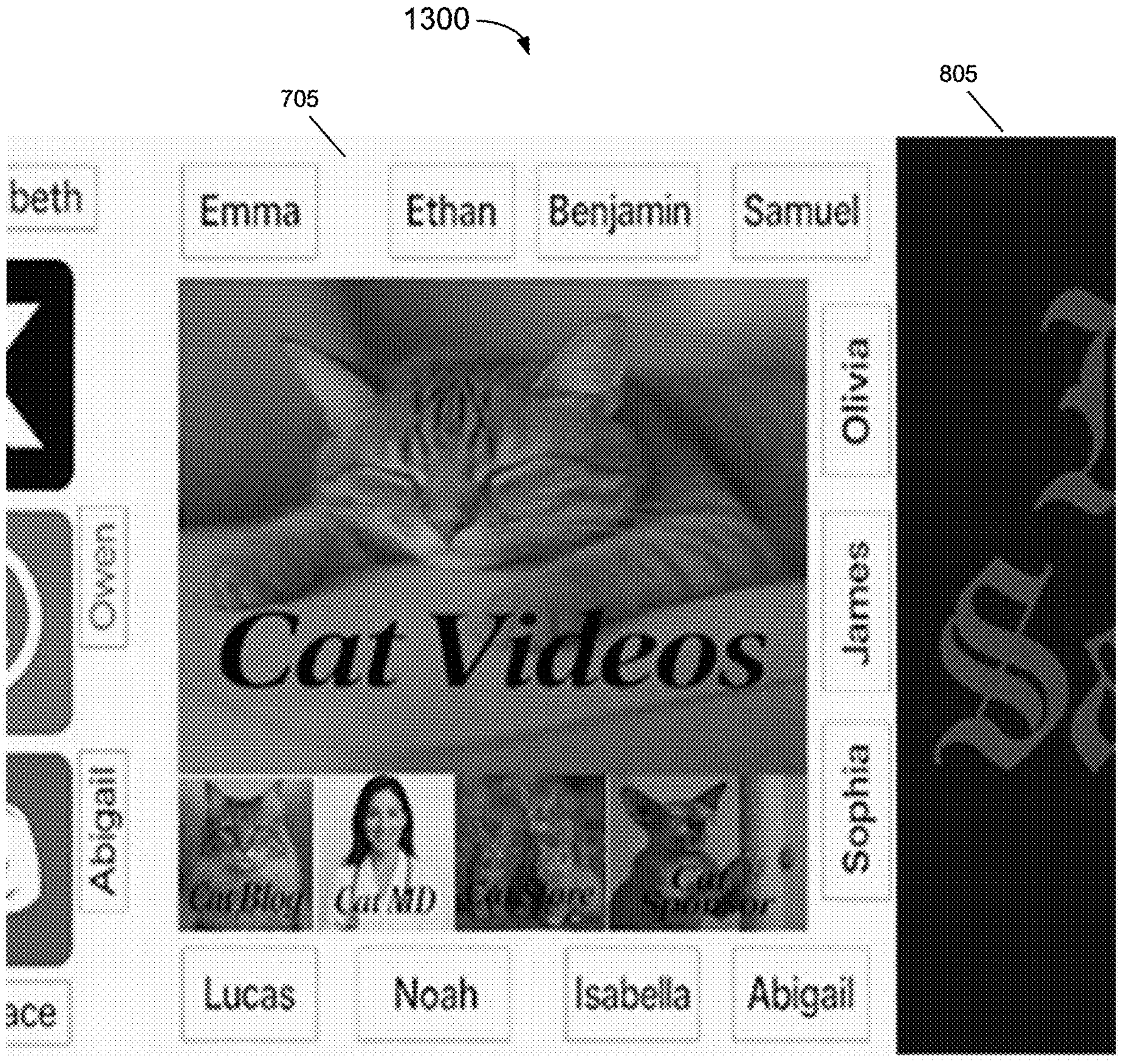
FIG. 13 is an illustration of an exemplary configurable Multiple Tile Villa, in accordance with an embodiment of the present invention.

FIG. 13 is an illustration of an exemplary configurable Multiple Tile Villa, in accordance with an embodiment of the present invention. The user may swipe to the right to see more of Inner Sanctum and Chat Tile. Or, to the left to see more of the social center to the left Tile, as shown. The palette Tile may also be arranged to show a single Tile at a time. In this case, it is considered a "paged Tile", but it is actually just a special case of the highly versatile palette Tile. This illustrates the goal for Tiles and their function-write once, use many.

Figure 14:
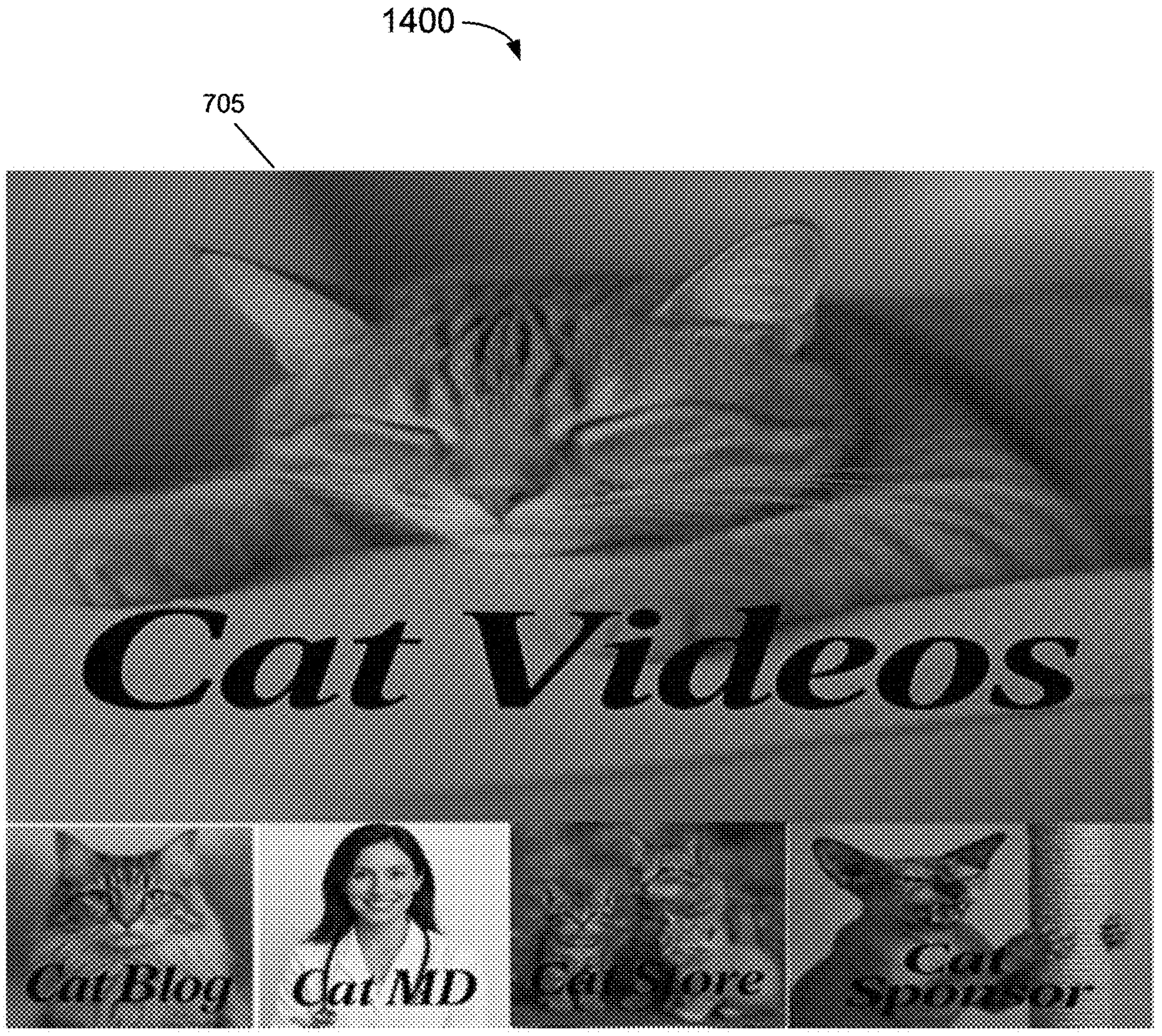
FIG. 14 is an illustration of an exemplary configurable Multiple Tile Villa, in accordance with an embodiment of the present invention.

FIG. 14 is an illustration of an exemplary configurable Multiple Tile Villa, in accordance with an embodiment of the present invention. In an embodiment of the present invention, a single Tile 705 may be selected (e.g. a finger tap, mouse click or double click at the Tile, depending on how its functional junctions have defined such interaction) to be viewed at a time in the palette Tile 1400, and may select the previous (e.g. right swipe/double tap) or the next (e.g. left swipe/three or more taps) Tile as needed.

A palette Tile may also be configured for variable spacing between Tiles, perhaps multiline, with a suitable background photo.

Figure 15:
FIG. 15 is an illustration of an exemplary palette Tile, in accordance with an embodiment of the present invention.

FIG. 15 is an illustration of an exemplary Palette Tile 1500, in accordance with an embodiment of the present invention. In one embodiment of the present invention, Palette Tile 1500 may be configured for variable spacing between Tiles including, without limitation, multiline, with a suitable background photo, as shown. Palette Tile may be based on MagicTile and may also have MagicTile features. Palette Tile may contain one or multiple Tiles within it. Tiles may be added to the PaletteTile using a Tile Editor.

Figure 16:
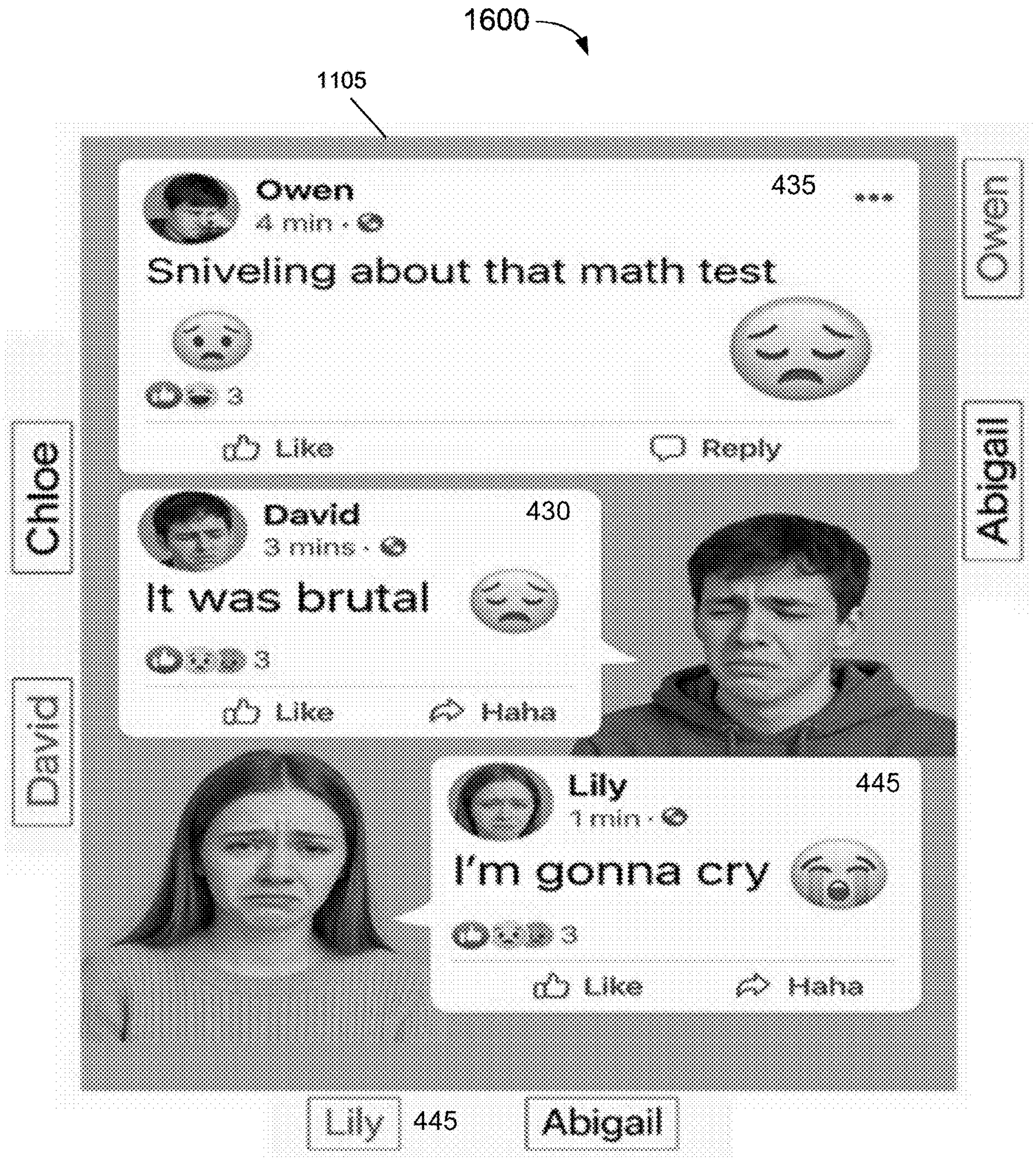
FIG. 16 is an illustration of an exemplary Tile Inclusion by Reference, in accordance with an embodiment of the present invention.

A well-conceived, versatile and configurable Tile may be used over and over in the system. One advantage of such high versatility is that a single Tile and its code may be reused as we move from one Villa to the next within relational space FIG. 16 is an illustration of an exemplary Tile Inclusion by Reference 1600, in accordance with an embodiment of the present invention.

Tile Inclusion by Reference: Referring to FIG. 11 and FIG. 16, Villa 1100 includes a Tile 1105 that was not created by the Villa owner (e.g. Valerie). Tile 1105 that is included by reference (as shown) is from a particular High School, where the owner is a senior student. Tile included by reference 1105 may allow a live chat using RSChat™ 710 from Social Media Home Page Tile 405, which itself uses the highly capable MediaStream™ Tile, a configurable social media engine that tries to get as close as possible to functionality of Facebook™/Twitter™/TikTok™, etc.

"Tile Inclusion by Reference" is a powerful feature of Relational Space. Since the owner (e.g. Valerie) decided to locate Villa 1100 in the High School, next to Student Center Tile 1105, the owner actually had the option of including Tile 1105, by reference, in the Relational Map of Villa 1100. The Villa owner is not in this case seeing a copy of the Student Center. In this case, The Villa owner is seeing the actual Student Center from her high school, and interacting with it live, from within Villa 1100. Referring to FIG. 4 and FIG. 16, Lily 445 may be doing the same where she included the Student Center 1105 in her own Villa. Owen 435 and David 430 may (or may not) have included the Student Center in their Villas, but in this case, they are directly interacting (live) with the Student Center from the High School Villa. Valerie herself is not participating in the active chat yet. Since she is able to see (and possibly hear) what is going on in the active chat, she could join in, from her own Villa.

Figure 17:
FIG. 17 is an illustration of an exemplary Persona, in accordance with an embodiment of the present invention.

FIG. 17 is an illustration of an exemplary Persona, in accordance with an embodiment of the present invention. In an embodiment of the present invention, a Villa owner (e.g. Valerie) may present different "faces" or Personas to different social groups, like family versus the public such as, without limitation, teachers, employers and business customers, which is a common and normal aspect of human psychology, often referred to as "masking". A Villa owner may "code-switch" to some extent, adapting individual communication style, mannerisms, and emotional expression based on a social setting. Villa owners may use masking as a form of "reputation management" to present a positive, agreeable, or professional image to the outside world. a different face to a family member than what is presented to teachers, employers, business customers.

Referring to FIG. 11 and FIG. 17, Relational Space (RS) supports masking or code-switching with exemplary Personas 1700. Personas 1700 may be subsets of the owner's Villa Tiles 405 705 805 1105 which may be presented to specific people for specific purposes. By way of illustration, a Villa owner may have a (semi) public persona called "CatMe", which the Villa owner presents to people interested in her cat videos and business. The Villa owner does not need (or want) these people to see or interact with her family or friends.

Figure 18:
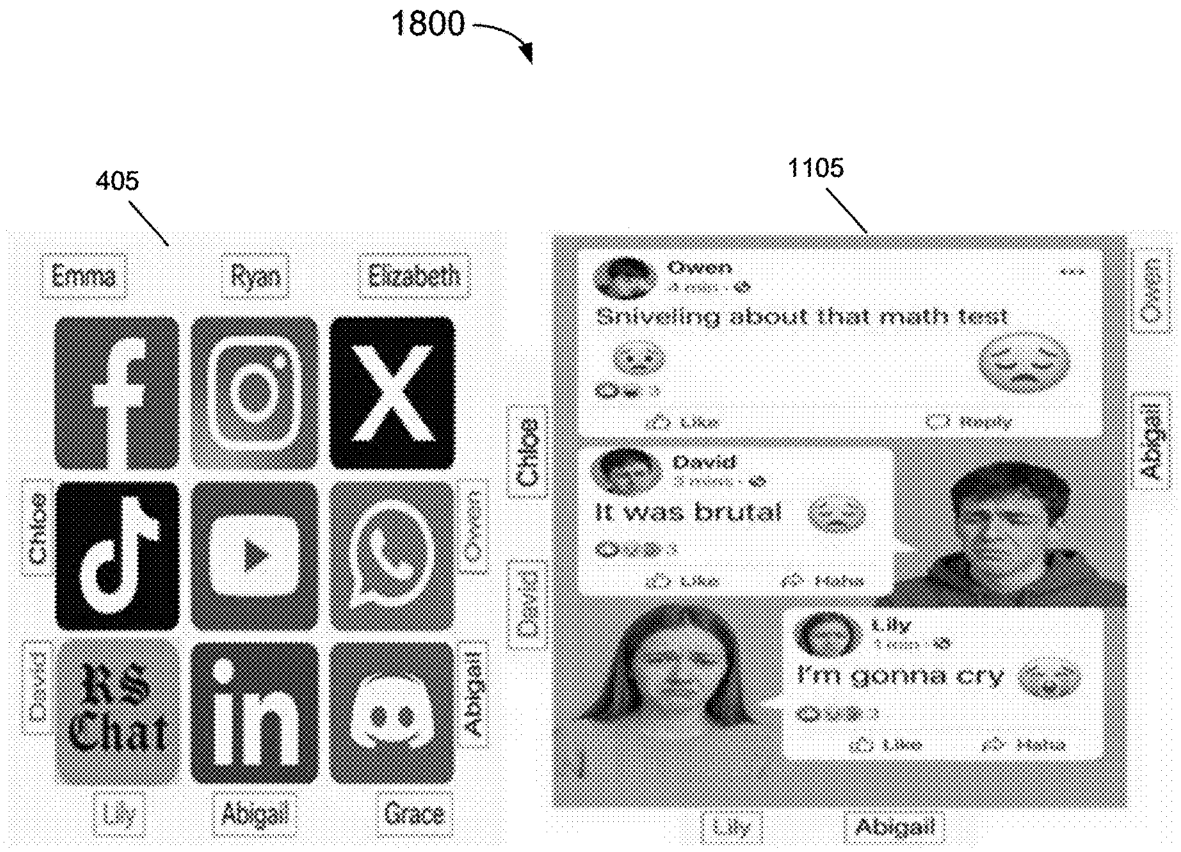
FIG. 18 is an illustration of an exemplary Persona, in accordance with an embodiment of the present invention.

FIG. 18 is an illustration of an exemplary Persona, in accordance with an embodiment of the present invention. In an embodiment of the present invention, the Villa owner may have a school Persona 1800 (e.g. school Persona) that the Villa owner may give to friends at school, which may include Student Center 1105 from the high school where they may interact live.

In some embodiment, referring to FIG. 4, FIG. 5 and/or FIG. 12. a Villa owner may have a (semi) private/public persona called "SocialMe", which the Villa owner may present to family and friends. Tile 405, with all of the Relational Links to social media 510-560, may be used by family/friends to interact with the Villa owner.

Figure 19:
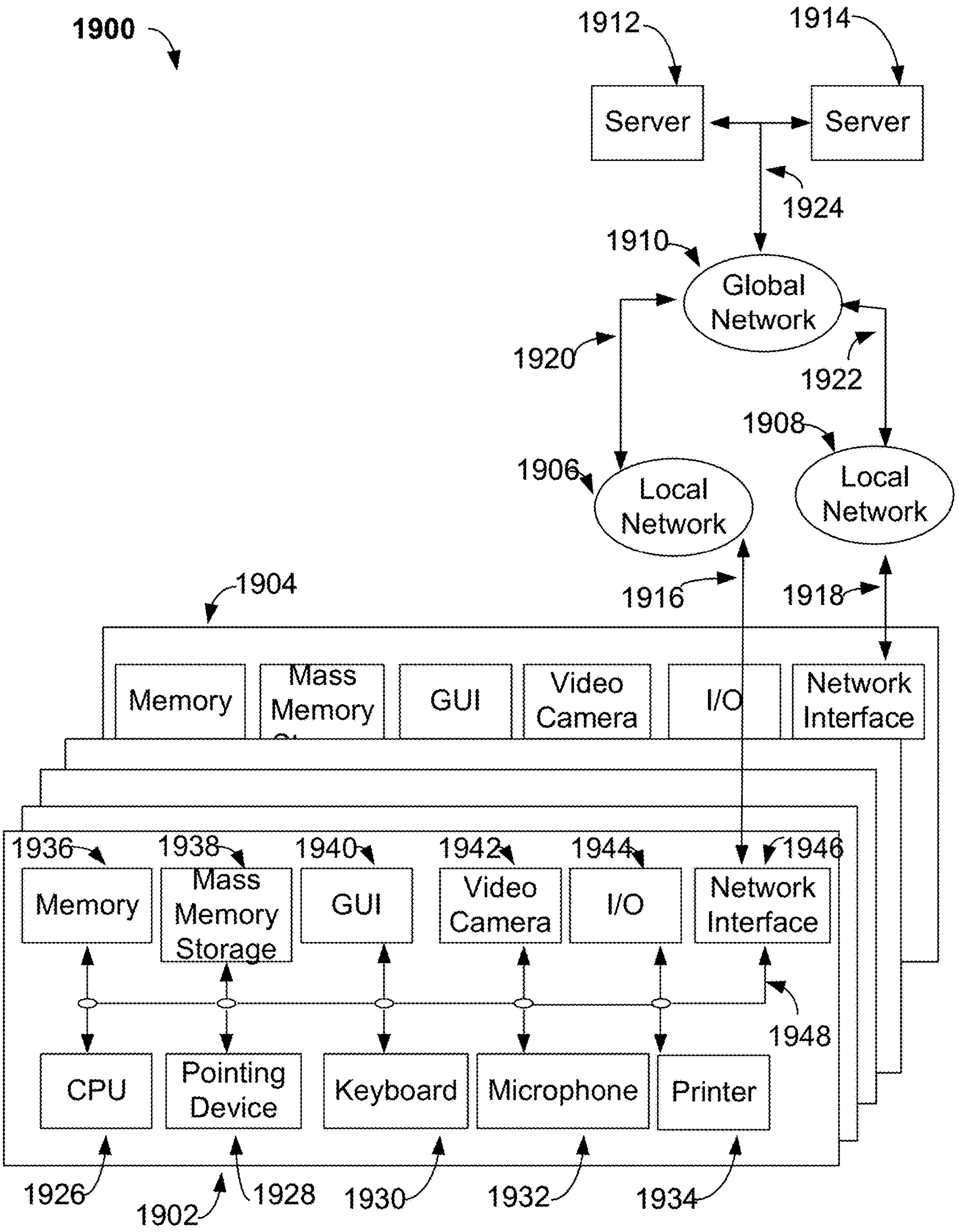
FIG. 19 is a block diagram depicting an exemplary client/server system which may be used by an exemplary web-enabled/networked embodiment of the present invention.

FIG. 19 is a block diagram depicting an exemplary client (e.g. computer) and/or server system which may be used by an exemplary web-enabled/networked embodiment of the present invention.

A communication system 1900 includes a multiplicity of clients (e.g. Villas) with a sampling of clients denoted as, without limitation, a first Villa client (e.g. computer) 1902 and a second Villa client (e.g. computing device) 1904, a multiplicity of local networks with a sampling of networks denoted as a local network 1906 and a local network 1908, a global network 1910 and a multiplicity of servers with a sampling of servers denoted as, without limitation, a Space Server 1912 and a Villa server 1914.

Space Servers 1912 may store data that is used throughout the system including, without limitation, Tiles, images, fonts, lists of Villas and people, etc. Villa clients may connect to the Space Server to find the Villa server. Space Servers may contain multiple Tiles and functional junctions. Space Servers are Tiles. And the Villa clients, which may run on, without limitation, user computers, computing devices and cell phones, and may contain multiple Tiles and functional junctions.

Client 1902 may communicate bi-directionally with local network 1906 via a communication channel 1916. Client 1904 may communicate bi-directionally with local network 1908 via a communication channel 1918. Local network 1906 may communicate bi-directionally with global network 1910 via a communication channel 1920. Local network 1908 may communicate bi-directionally with global network 1910 via a communication channel 1922. Global network 1910 may communicate bi-directionally with Space Server 1912 and Villa Server 1914 via a communication channel 1924. Space Server 1912 and Villa Server 1914 may communicate bi-directionally with each other via communication channel 1924. Furthermore, Villa clients 1902, 1904, local networks 1906, 1908, global network 1910 and servers 1912, 1914 may each communicate bi-directionally with each other.

In one embodiment, global network 1910 may operate as the Internet. It will be understood by those skilled in the art that communication system 1900 may take many different forms. Non-limiting examples of forms for communication system 1900 include local area networks (LANs), wide area networks (WANs), wired telephone networks, wireless networks, or any other network supporting data communication between respective entities.

Villa Clients 1902 and 1904 may take many different forms. Non-limiting examples of clients 1902 and 1904 include personal computers, personal digital assistants (PDAs), cellular phones and smartphones.

Villa Client 1902 may include, without limitation, a CPU 1926, a pointing device 1928, a keyboard 1930, a microphone 1932, a printer 1934, a memory 1936, a mass memory storage 1938, a GUI 1940, a video camera 1942, an input/output interface 1944 and a network interface 1946.

CPU 1926, pointing device 1928, keyboard 1930, microphone 1932, printer 1934, memory 1936, mass memory storage 1938, GUI 1940, video camera 1942, input/output interface 1944 and network interface 1946 may communicate in a unidirectional manner or a bi-directional manner with each other via a communication channel 1948. Communication channel 1948 may be configured as a single communication channel or a multiplicity of communication channels.

CPU 1926 may be comprised of a single processor or multiple processors. CPU 1926 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors.

As is well known in the art, memory 1936 is used typically to transfer data and instructions to CPU 1926 in a bi-directional manner. Memory 1936, as discussed previously, may include any suitable computer-readable media, intended for data storage, such as those described above excluding any wired or wireless transmissions unless specifically noted. Mass memory storage 1938 may also be coupled bi-directionally to CPU 1926 and provides additional data storage capacity and may include any of the computer-readable media described above. Mass memory storage 1938 may be used to store programs, data and the like and is typically a secondary storage medium such as a hard disk. It will be appreciated that the information retained within mass memory storage 1938, may, in appropriate cases, be incorporated in standard fashion as part of memory 1936 as virtual memory.

CPU 1926 may be coupled to GUI 1940. GUI 1940 enables a user to view the operation of computer operating system and software. CPU 1926 may be coupled to pointing device 1928. Non-limiting examples of pointing device 1928 include computer mouse, trackball and touchpad. Pointing device 1928 enables a user with the capability to maneuver a computer cursor about the viewing area of GUI 1940 and select areas or features in the viewing area of GUI 1940. CPU 1926 may be coupled to keyboard 1930. Keyboard 1930 enables a user with the capability to input alphanumeric textual information to CPU 1926. CPU 1926 may be coupled to microphone 1932. Microphone 1932 enables audio produced by a user to be recorded, processed and communicated by CPU 1926. CPU 1926 may be connected to printer 1934. Printer 1934 enables a user with the capability to print information to a sheet of paper. CPU 1926 may be connected to video camera 1942. Video camera 1942 enables video produced or captured by user to be recorded, processed and communicated by CPU 1926.

CPU 1926 may also be coupled to input/output interface 1944 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, C P U 1926 optionally may be coupled to network interface 1946 which enables communication with an external device such as a database or a computer or telecommunications or internet network using an external connection shown generally as communication channel 1916, which may be implemented as a hardwired or wireless communications link using suitable conventional technologies. With such a connection, CPU 1926 might receive information from the network, or might output information to a network in the course of performing the method steps described in the teachings of the present invention.

Figure 20:
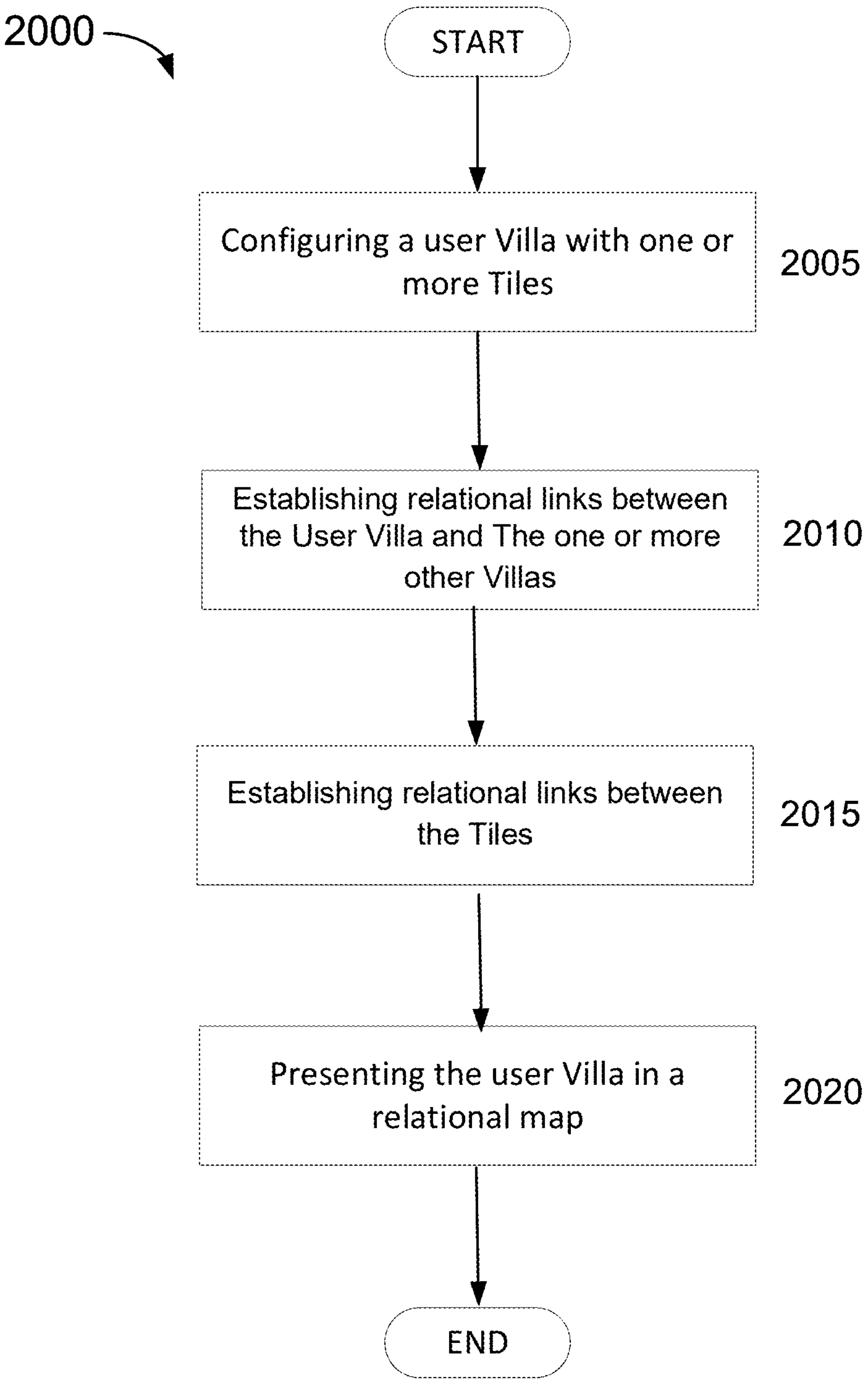
FIG. 20 is an illustration of an exemplary flowchart for providing a relational map, in accordance with an embodiment of the present invention.

FIG. 20 is an illustration of an exemplary flowchart 2000 for providing a process or method of creating a relational map, in accordance with an embodiment of the present invention. In one embodiment of the present invention, the process/method, executed by one or more processors, for providing the relational map may comprise, without limitation, the following steps:

In a Step 2005, a Villa may be configured to include one or more Tiles. For instance, referring to FIG. 1 (and FIGS. 2-3), Tile 105 may include, without limitation, one or more functional junctions 110 having one or more typed input (user click) 107, one or more processes and one or more typed output (click) 115 for connection to another Tile, for more complex combined function. Referring to FIG. 7, Villa 700 contains two at least (2) functional junction connected Tiles 405 705. A functional junction may have multiple (even unlimited) typed inputs and outputs where the Junction Inputs/Outputs may allow bidirectional data and may be typed as Relational Links.

In a Step 2010, establishing relational links between a home Villa and one or more other external Villas (e.g. Relational Villa). For example, referring to FIG. 4, Villa 400 may contain Tile 405 and linked to external Villas 410-455. The relational link may be non-spatial link connecting home Villa 400 to external Villas 410-455.

In a Step 2015, establishing relational links between the Tiles (e.g. Relational Tiles). To illustrate, referring to FIG. 8 and FIG. 9, Tile 405 is linked to Tile 705 and Tile 705 is linked to Tile 805. MultiTile structure 905 may be activated (e.g. by a mouse click or finger tap) through Inner Sanctum Tile 805. Tiles may obtain multiple simultaneous locations by placing Relational Links (from the Tile). Tiles may have one or multiple outgoing Relational Links originating from the Tile itself, not from others connecting to it.

In a Step 2015, presenting the user Villa in a relational map as shown in FIGS. 1-18.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied. Such computers referenced and/or described in this disclosure may be any kind of computer, either for general purpose, or some specific purpose computer such as, but not limited to, a workstation, a mainframe, GPU, ASIC, etc. The programs may be written in C, or Java, Brew or any other suitable programming language. The programs may be resident on a storage medium, e.g., magnetic or optical, e.g., without limitation, the computer hard drive, a removable disk or media such as, without limitation, a memory stick or SD media, or other removable medium. The programs may also be run over a network, for example, with a server or other machine sending signals to the local machine, which allows the local machine to carry out the operations described herein.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

In some embodiments, the methods and/or system components which may be located and/or performed remotely. For example, without limitation, the entire system may be split into villa servers (in the cloud, could be anywhere), and villa clients which live in the user's device, typically in a browser. Villa servers are very stupid and primarily send/receive save/retrieve data, and little else. All of the specific software and methods of Relational Terrain are executed in the villa client in the user's device. It is practically impossible to locate more functionality in an offshore server, since that has extreme penalties on lag time/responsiveness and huge increase in server processor expense and data bandwidth.

It is noted that according to USA law, all claims must be set forth as a coherent, cooperating set of limitations that work in functional combination to achieve a useful result as a whole. Accordingly, for any claim having functional limitations interpreted under 35 USC § 112(6)/(f) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6)/(f) is/(are) dependent on one or more remote servers located outside the USA, it is intended that each such recited function under 35 USC § 112 (6)/(f) is to be interpreted as the function of the local system receiving the remotely generated information required by a locally implemented claim limitation, wherein the structures and or steps which enable, and breathe life into the expression of such functions claimed under 35 USC § 112 (6)/(f) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present patent application, and "35 USC § 112 (6)/(f)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112(6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve the right to later amend the present application to explicitly include citations to such documents and/or explicitly include the functionally corresponding structures which were incorporated by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application and thus are valid prior documents to incorporated by reference in the instant application.

Having fully described at least one embodiment of the present invention, other equivalent or alternative methods of implementing Relational Terrain in designing Villas (homes) and communities according to the present invention will be apparent to those skilled in the art. Various aspects of the invention have been described above by way of illustration, and the specific embodiments disclosed are not intended to limit the invention to the particular forms disclosed. The particular implementation of the Relational Terrain in designing Villas (homes) and communities may vary depending upon the particular context or application. By way of example, and not limitation, the Relational Terrain described in the foregoing were principally directed to designing Villas (homes) and harmonious community implementations; however, similar techniques may instead be applied to building farming business applications such as poultry, piggery, etc., which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A method, executed by one or more processors, for providing a relational terrain, the method comprising the following steps:

establishing a user owned Villa, wherein said user owned Villa is configured to be operable for containing one or more Tile(s);

wherein each of said one or more Tile(s) comprise(s) one or more other Tile(s);

establishing one or more relational link(s) between said user owned Villa and one or more other user owned Villa(s);

wherein said one or more relational link(s) is/are a non-spatial link(s) connecting said user owned Villa to said one or more other user owned Villa(s) thereby establishing one or more relational terrain(s) that are not a dimensional or spatial mapping;

reflecting said one or more relational link(s) between said user owned Villa and said one or more other user owned Villa(s); and displaying said user owned Villa and said one or more other user owned Villa(s) in a relational map.

2. The method of claim 1, wherein at least one of said Tiles is configured to have at least one outgoing Relational Link(s) originating from the Tile itself, connecting to other related Tile(s), thereby enabling an originating Tile to obtain multiple simultaneous locations.

3. The method of claim 1, further comprising the steps of creating a complex Tile by combining or connecting many simpler building blocks or Tiles, thereby making it easier for a user to build something creative or useful by combining useful Tiles created by others.

4. The method of claim 1, wherein said one or more Tile(s) are different from each other, yet share the same software;

wherein a Villa owner decides on community standards for speech and conduct; and wherein community is governed through mutual consent of the owner and Villa members.

5. The method of claim 1, wherein said one or more Tile(s) is/are being provided in different forms and functions through software and/or gene regulation.

6. The method of claim 1, further comprising the steps of improving designs and/or solutions, rather than de novo construction and/or inventing new ones to increase a complexity of said one or more Tile(s).

7. The method of claim 1, further comprising the steps of recombining said one or more Tiles to achieve genetic software or software diversity rather than creating new genes.

8. The method of claim 1, further comprising the steps of:

combining a small core library of highly capable, highly configurable Tiles to increase functionality;

wherein said core is used everywhere in the system; and loading into a cache in a client, decreasing a need for a module/Tile churn as user moves from one Villa to another.

9. The method of claim 1, further comprising the steps of:

consolidating a functionality of said one or more Tile(s) into a single capable and configurable Tile called MagicTile, which could be the ancestor of all Tiles in the system, providing functionality to all descendants;

wherein, said MagicTile is configured to be operable for creating a single place to create and standardize function, interface and maintenance.

10. The method of claim 9, wherein a development of said MagicTile is operable to be iterative and ongoing, seeking to move as much function as practical into said MagicTile to make a MagicTile configuration available to all descendant Tiles.

11. The method of claim 1, wherein said one or more Tile(s) is/are configured to connect to the one or more other Tile(s) through one or more functional junction(s).

12. The method of claim 11, wherein said one or more functional junction(s) placed in said one or more Tile(s) comprise(s) at least one input(s) and one or more output(s) available on said one or more Tile surface for connection to said one or more other Tile(s).

13. The method of claim 12, wherein said one or more functional junction(s) comprise(s) one or more typed functional junction(s), and wherein said one or more typed functional junction(s) is/are configured to guide users in how to functionally connect to other Tiles.

14. The method of claim 12, wherein said one or more Tile junctions is/are enabled and/or disabled for configured functionality.

15. The method of claim 12, wherein said one or more functional junction(s) inputs and/or outputs are configured to allow bidirectional data;

wherein said one or more functional junction(s) input and/or output designation is configured to be operable for providing guidance on how to connect; and wherein said one or more functional junction(s) input and/or output do not restrict the direction of data flow; and wherein said one or more functional junction(s) input is/are configured to connect to output(s).

16. The method of claim 12, wherein said one or more functional junction(s) comprise(s) multiple typed input(s) and/or output(s);

wherein some connections may be typed, others may be more permissive, depending on the guidance intended by the designer.

17. The method of claim 11, wherein said one or more functional junction(s) inputs and/or outputs is/are typed as Relational Links.

18. The method of claim 12, wherein said one or more functional junction(s) is/are configured to combine to form a complex functional network of junctions within a Tile; wherein said one or more functional junction(s) contain other junctions or a network of junctions, with said one or more functional junction(s) inputs/outputs projecting to a surface of the junction.

19. The method of claim 1, further comprising the steps of:

forming Converging and Diverging interest funnels by a network of Relational Links passing to and from a Villa; and traversing said interest funnels to find users/Villas with similar or related interests, maximizing social and economic potential.

20. The method of claim 1, further comprising the step of placing Relational Links to said one or more Villas, which is a qualitatively different from inferring user interests from interaction or statistical analysis; and wherein Relational Hubs comprise said one or more Villas central to a network of Villas sharing interests or Interest Funnels and gain value based on Villa location between areas/interest networks.

21. The method of claim 1, further comprising the step of bridging, with Relational Terrain, to the next generation including a Metaverse/Social World, with incremental transition, agnostic and compatible with new software and hardware technologies;

wherein said Relational Terrain is configured to define a social network connecting users with whatever hardware and software is running; and wherein said Relational Terrain is configured to provide at least one of a shield and a sword for a transition to metaverse/social worlds;

wherein, as a shield, said Relational Terrain is configured to be operable for protecting users during their move to the next generation, establishing valuable social relational networks using current technology.

22. The method of claim 21, wherein at least one of said Relational Terrain and an Functional Junctional Mosaic Terrain (FJMT) comprise a low code/no code application environment, thereby enabling low skill, ordinary users to build useful Tiles or applications.

23. The method of claim 1, wherein Villas comprise online homes where users may place unified identity, including links to social media websites using Relational Links so these may be directly within their Villas/communities; and wherein a Villa is configured to be operable for providing a community for friends, colleagues, family to locate their Villas and interact.

24. The method of claim 1, wherein each Villa comprises multiple Relational Links or simultaneous locations, allowing owner's interests to be brought into each Villa and Villa community operable as a User Centric Web;

wherein each Villa is configured to be member of multiple other communities;

wherein each Villa is operable to split one or more function(s) and real estate(s) into multiple Tiles, configured to allow users to focus on a specific Tile and/or functional area; and, wherein each Villa is configured to be customizable, and easily changed with the interests and relations of a Villa owner.

25. The method of claim 1, wherein one or more Palette(s) is configured to organize Tiles, display and allow expansion to a full display;

wherein said one or more Palette(s) is configured from single line of Tiles to multiline palettes with background image, windowed view into an array of Tiles;

wherein a Villa is configured to be available physically and functionally present to the one or more other Villas throughout Relational Space; and wherein said Villa include one or more private Tile(s) or Inner Sanctum(s) to enable users to create multiple different Villas to present to different kinds of people including at least one of a family, a coworker, a student and a customer and further enable users to have a granular control of how users present themselves to the web and metaverse.

26. The method of claim 1, wherein said one or more Tile(s) is/are configured to connect to the one or more other Tile(s) through one or more functional junction(s);

wherein said one or more functional junction(s) placed in said one or more Tile(s) comprise(s) at least one input(s) and one or more output(s) available on said one or more Tile surface for connection to said one or more other Tile(s);

wherein said one or more functional junction(s) comprise(s) one or more typed functional junction(s);

wherein said one or more typed functional junction(s) is/are configured to guide users in how to functionally connect to other Tiles; and wherein said one or more functional junction(s) inputs and/or outputs is/are typed as Relational Links.

27. A method, executed by one or more processors, for providing a relational terrain, the method comprising the following steps:

establishing a user owned Villa, wherein said user owned Villa is configured to be operable for containing one or more Tile(s);

wherein each of said one or more Tile(s) comprise(s) one or more other Tile(s);

wherein said one or more other Tile(s) comprise(s) one or more Functional Junctions, each of said one or more Functional Junctions having at least one of a typed input, a process and one typed output;

establishing one or more relational link(s) between said user owned Villa and one or more other Villa(s);

wherein said one or more relational link(s) is/are a non-spatial link(s) connecting said user owned Villa to said one or more other user owned Villa(s) thereby establishing one or more relational terrain(s) that are not dimensional or spatial mapping;

reflecting said one or more relational link(s) between said user owned Villa and said one or more other user owned Villa(s); and displaying said Villa and said one or more other Villa(s) in a relational map.

28. A software program product stored as computer code on a non-transitory computer-readable storage medium, which code is operable to be executed by one or more processors to achieve the coded functions, the program product, the program product comprising:

computer code for establishing a user owned Villa, wherein said user owned Villa is configured to be operable for containing one or more mosaic Tile(s);

wherein each of said one or more mosaic Tile(s) comprise(s) one or more other Tile(s);

computer code for establishing one or more relational link(s) between said user owned Villa and one or more other user owned Villa(s);

wherein said one or more relational link(s) is/are a non-spatial link(s) connecting said user owned Villa to said one or more other user owned Villa(s) thereby establishing one or more relational terrain(s) that are not dimensional or spatial mapping;

computer code for reflecting said one or more relational link(s) between said user owned Villa and said one or more other user owned Villa(s); and computer code for presenting said Villa and said one or more other user owned Villa(s) in a relational map.

29. A method comprising:

Steps for creating at least one user owned Villa, said user owned Villa comprises one or more mosaic Tile(s), wherein each of said one or more mosaic Tile(s) comprise(s) one or more other Tile(s);

Steps for creating at least one Functional Junction(s), wherein each of said one or more Functional Junction(s) having at least one of a typed input, a process and one typed output;

Steps for establishing one or more relational link(s) between said user owned Villa and one or more other user owned Villa(s);

wherein said one or more relational link(s) is/are a non-spatial link(s) connecting said Villa to said one or more other user owned Villa(s) thereby establishing one or more relational terrain(s) that are not dimensional or spatial mapping;

Steps for reflecting said one or more relational link(s) between said user owned Villa and said one or more other user owned Villa(s);

Steps for creating at least one Converging and Diverging interest funnels of a network of Relational Links passing to and from a user owned Villa;

Steps for creating at least one Relational Hubs, said one or more Relational Hubs comprise said one or more user owned Villas central to a network of user owned Villas sharing interests or Interest Funnels and gain value based on Villa location between areas/interest networks; and Steps for displaying or presenting said user owned Villa and said one or more other user owned Villa(s) in a relational map.

30. The method of claim 29, wherein said one or more Tile(s) is/are configured to connect to the one or more other Tile(s) through said one or more functional junction(s);

wherein said one or more functional junction(s) being placed in said one or more Tile(s);

wherein said one or more Tile(s) comprise(s) at least one input(s) and one or more output(s);

wherein said one or more input(s) and one or more output(s) is/are configured to be available on said one or more Tile surface for connection to said one or more other Tile(s); and wherein said one or more functional junction(s) comprise(s) one or more typed functional junction(s), and wherein said one or more typed functional junction(s) is/are configured to guide users in how to functionally connect to other Tiles.

* * * * *